United States Patent
Porter et al.

(10) Patent No.: US 7,602,811 B2
(45) Date of Patent: Oct. 13, 2009

(54) SYNCHRONIZATION IN A COMMUNICATION SYSTEM

(75) Inventors: John David Porter, Gt. Shelford (GB); Benedict Russell Freeman, Cambridge (GB)

(73) Assignee: Cambridge Broadband Limited, Cambridge (GB)

( * ) Notice: Subject to any disclaimer, the term of this patent is extended or adjusted under 35 U.S.C. 154(b) by 560 days.

(21) Appl. No.: 10/510,406

(22) PCT Filed: Apr. 3, 2003

(86) PCT No.: PCT/GB03/01477

§ 371 (c)(1), (2), (4) Date: Apr. 1, 2005

(87) PCT Pub. No.: WO03/088595

PCT Pub. Date: Oct. 23, 2003

(65) Prior Publication Data
US 2005/0175037 A1    Aug. 11, 2005

(30) Foreign Application Priority Data
Apr. 11, 2002    (GB) ............................... 0208374.9

(51) Int. Cl.
*H04J 3/06* (2006.01)
(52) U.S. Cl. ...................... 370/503; 375/356
(58) Field of Classification Search ............ 370/97, 370/380, 381, 413, 352, 395, 516, 503, 515, 370/316, 324; 713/400, 500; 375/376, 372, 375/7, 350; 368/10; 327/156; 324/83; 455/502
See application file for complete search history.

(56) References Cited

U.S. PATENT DOCUMENTS

| | | | |
|---|---|---|---|
| 4,006,952 A * | 2/1977 | Puckett | 439/4 |
| 5,062,124 A | 10/1991 | Hayashi et al. | |
| 5,099,477 A * | 3/1992 | Taniguchi et al. | 370/501 |
| 5,140,611 A * | 8/1992 | Jones et al. | 375/219 |
| 5,335,223 A * | 8/1994 | Iino | 370/503 |
| 5,524,029 A * | 6/1996 | Takenaka et al. | 375/356 |
| 5,615,177 A * | 3/1997 | Yahata | 368/10 |
| 5,640,388 A | 6/1997 | Woodhead et al. | |
| 5,864,248 A * | 1/1999 | Rokugo | 327/156 |
| 5,869,968 A * | 2/1999 | Brooks et al. | 324/338 |

(Continued)

FOREIGN PATENT DOCUMENTS

EP    0 718 995    6/1996

(Continued)

*Primary Examiner*—Kwang B Yao
*Assistant Examiner*—Syed Bokhari
(74) *Attorney, Agent, or Firm*—Fish & Richardson P.C.

(57) ABSTRACT

A packet switched communications system and method for transmitting synchronous data from a source module (4) to a terminating module (8) over a network comprising plurality of modules (4, 5, 7, 8) interconnected via transmission links (2, 6, 9). Each module operates with a clock of nominal frequency that is not synchronized with the clocks of the other module(s) and has a single input and one or more outputs. The method includes determining the phase difference between the input clock and the output clock of each module, and transmitting the phase difference to the terminating module (8) in the network. The received accumulated phase difference at the terminating module (8) is used to lock the output clock at the terminating module to the input clock at the source module.

20 Claims, 20 Drawing Sheets

Reference architecture for E1 to E1 method

U.S. PATENT DOCUMENTS

| | | | |
|---|---|---|---|
| 6,021,128 A * | 2/2000 | Hosoya et al. | 370/380 |
| 6,049,886 A * | 4/2000 | Motoyama | 713/400 |
| 6,119,016 A * | 9/2000 | Matusevich | 455/502 |
| 6,222,894 B1 * | 4/2001 | Lee | 375/376 |
| 6,229,774 B1 * | 5/2001 | Yasuda | 369/47.28 |
| 6,272,138 B1 * | 8/2001 | Weon | 370/395.62 |
| 6,327,273 B1 * | 12/2001 | Van der Putten et al. | 370/503 |
| 6,577,693 B1 * | 6/2003 | Wolf | 375/372 |
| 6,611,932 B2 * | 8/2003 | How et al. | 714/724 |
| 6,661,811 B1 * | 12/2003 | Baker | 370/516 |
| 6,735,711 B2 * | 5/2004 | Lutz | 713/500 |
| 6,791,987 B1 * | 9/2004 | Eng et al. | 370/395.62 |
| 2002/0051509 A1 * | 5/2002 | Lindner et al. | 375/376 |

FOREIGN PATENT DOCUMENTS

| | | |
|---|---|---|
| EP | 0 841 767 | 5/1998 |
| WO | WO 96/39761 | 12/1996 |

* cited by examiner

Figure 1:
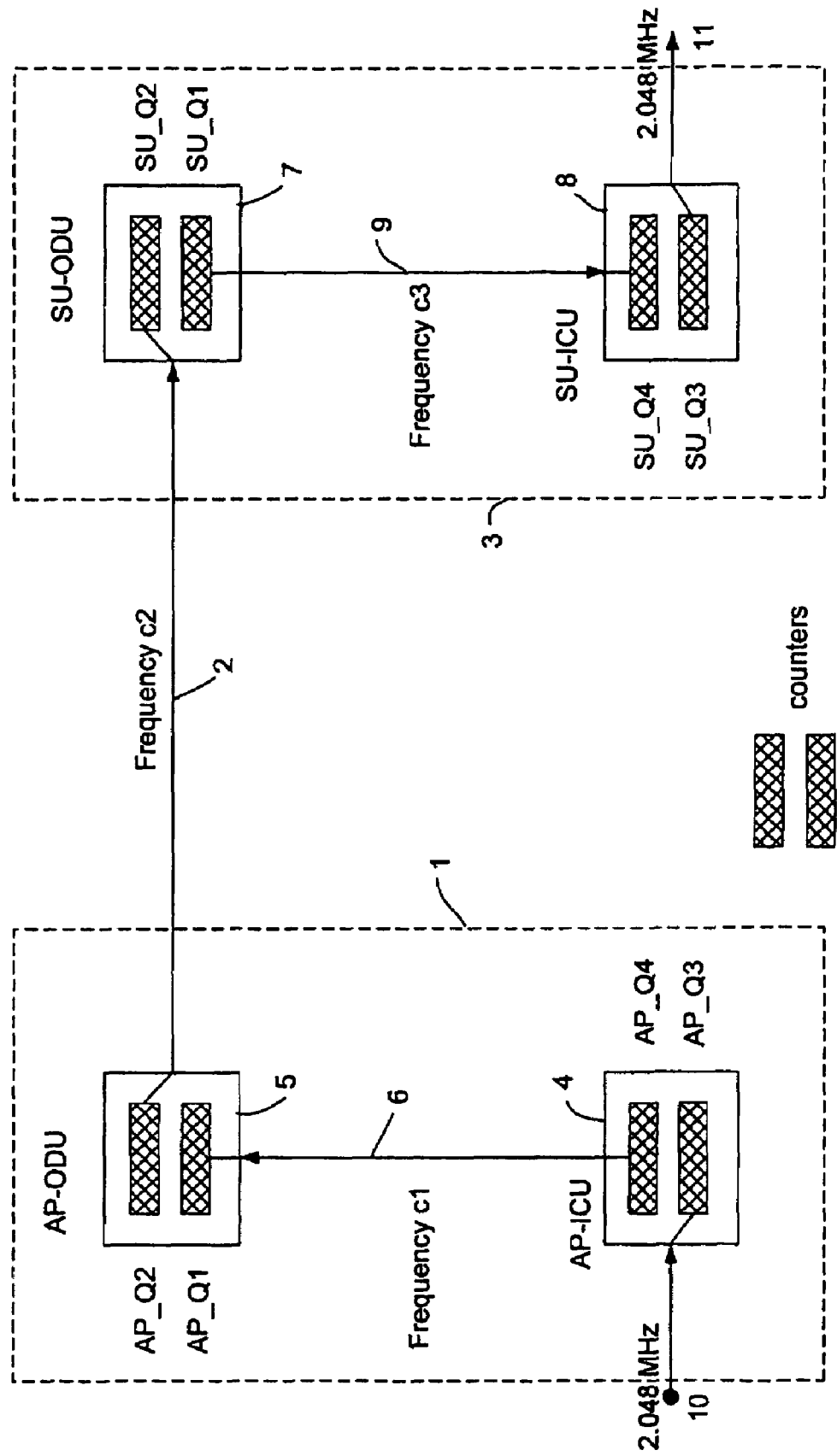

Fig. 1 Reference architecture for E1 to E1 method

Reference architecture for SONET/SDH to E1 method

Reference architecture for SONET/SONET synchronisation

MAC counter structure for ATM 155 ODU

MAC counter structure for ATM 25 ODU

ATM 155 ICU counter structure

ATM 25 ICU counter structure

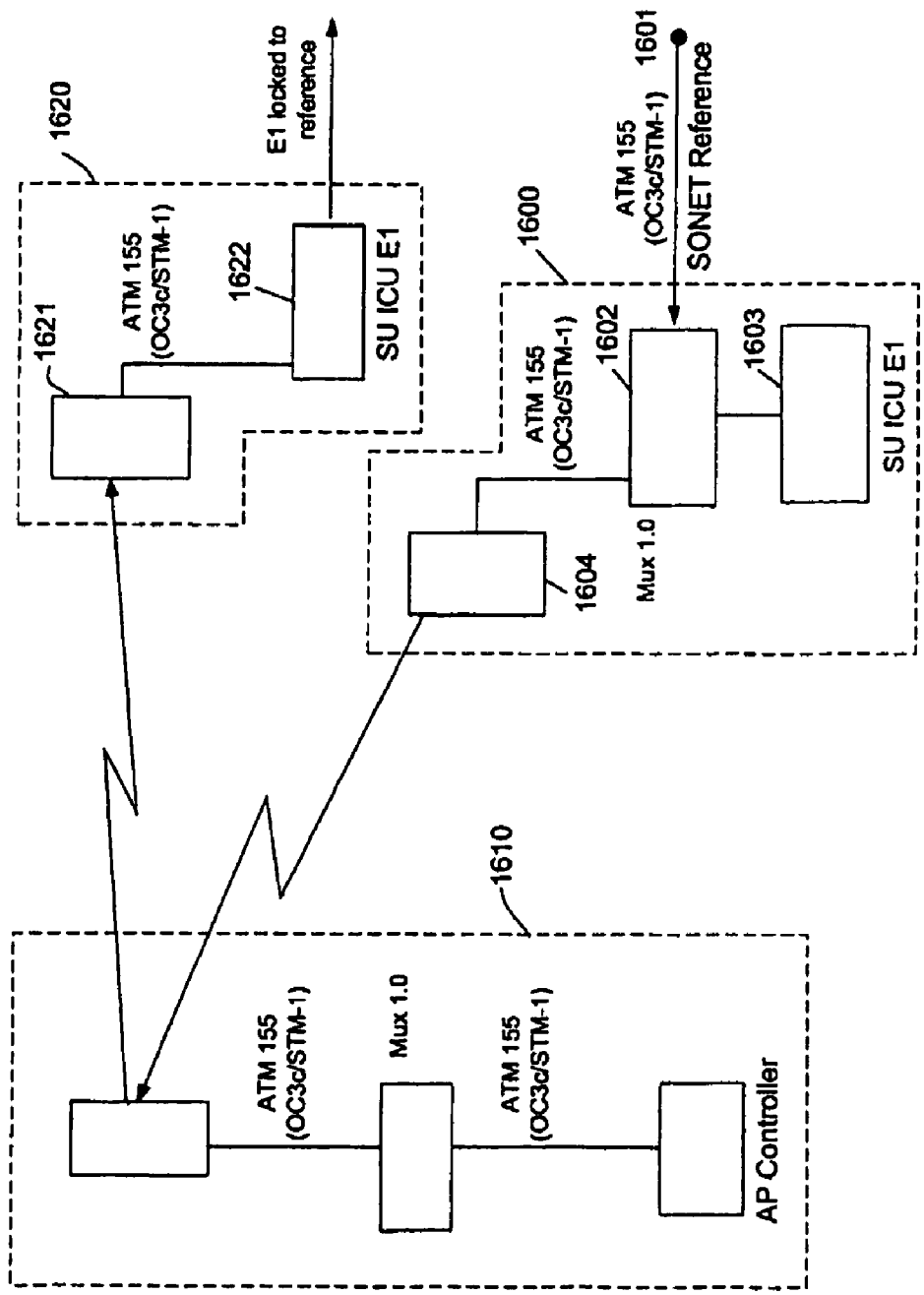
Fig.16 E1 Synchronisation Architecture 4

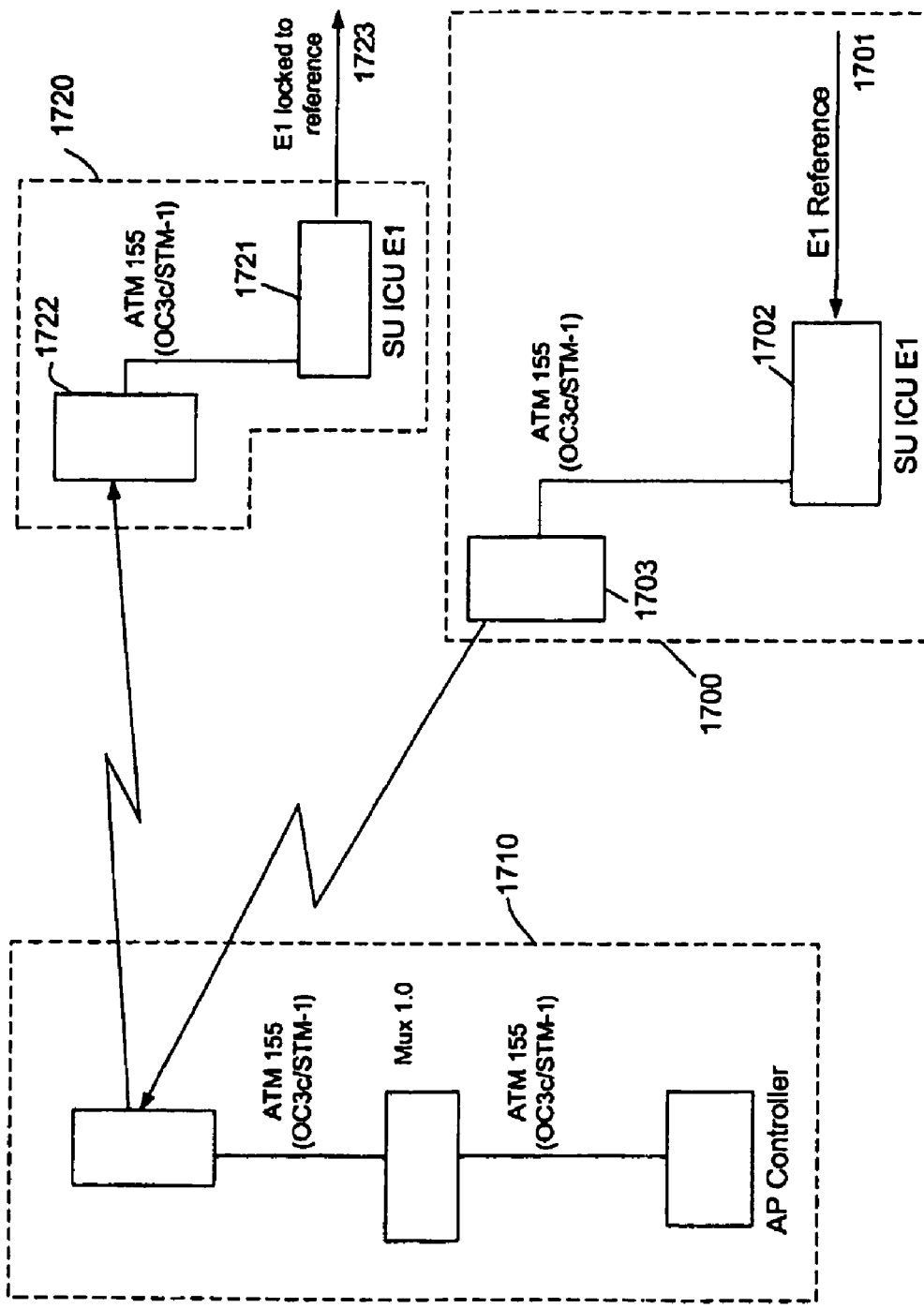
Fig. 17 E1 Synchronisation Architecture 5

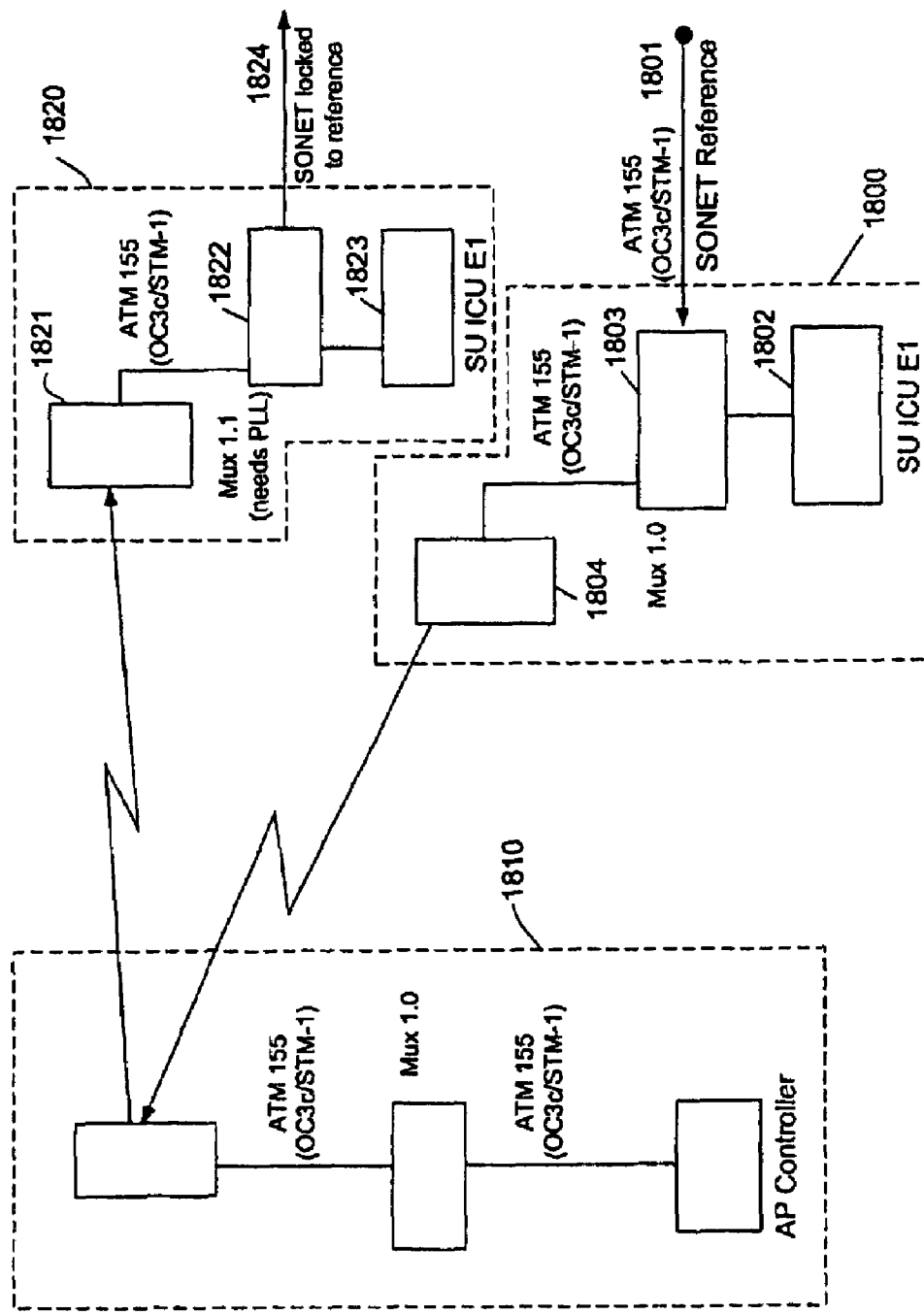
Fig. 18  E1 Synchronisation Architecture 6

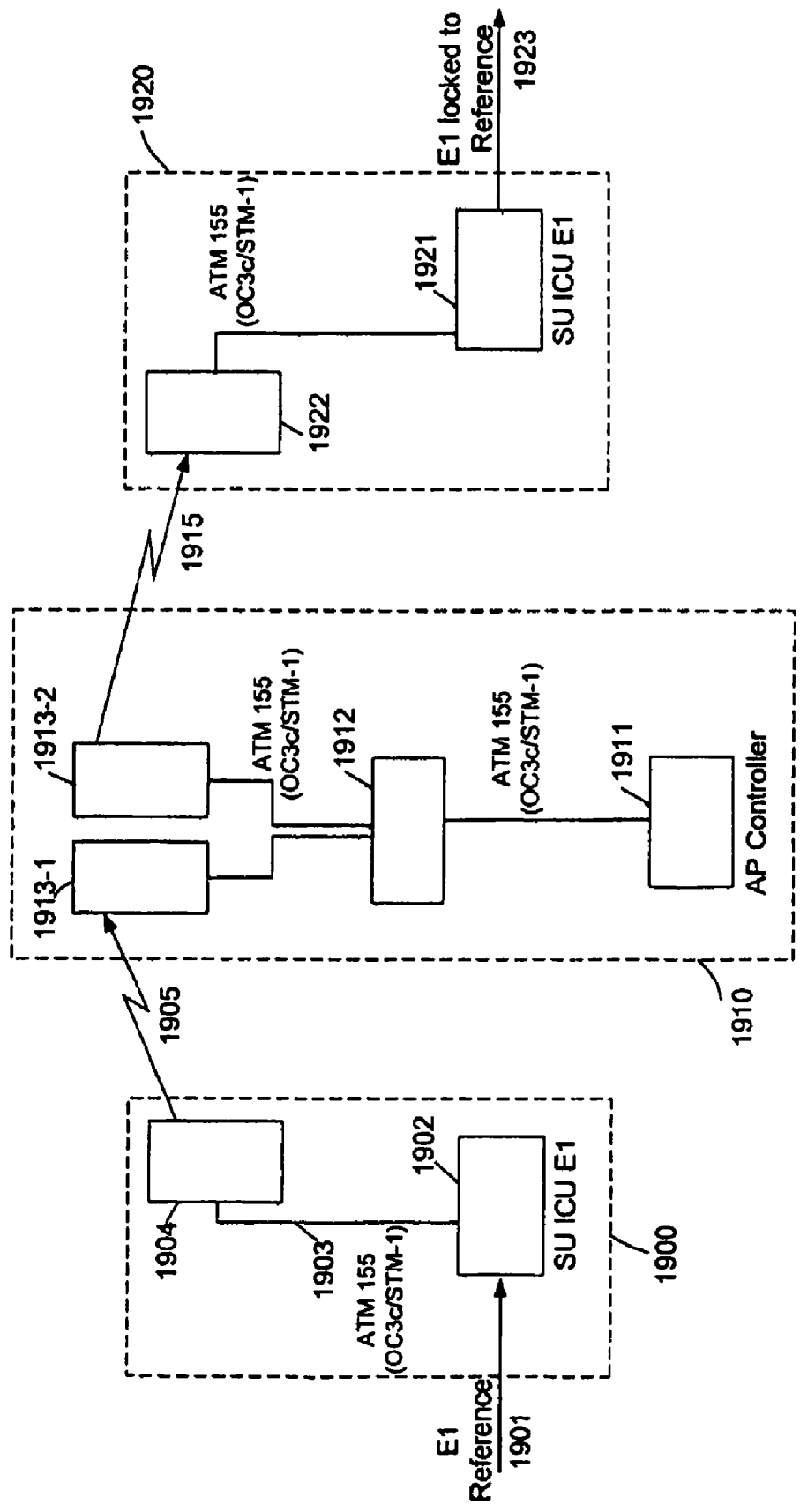
Fig. 19 E1 Synchronisation Architecture 7

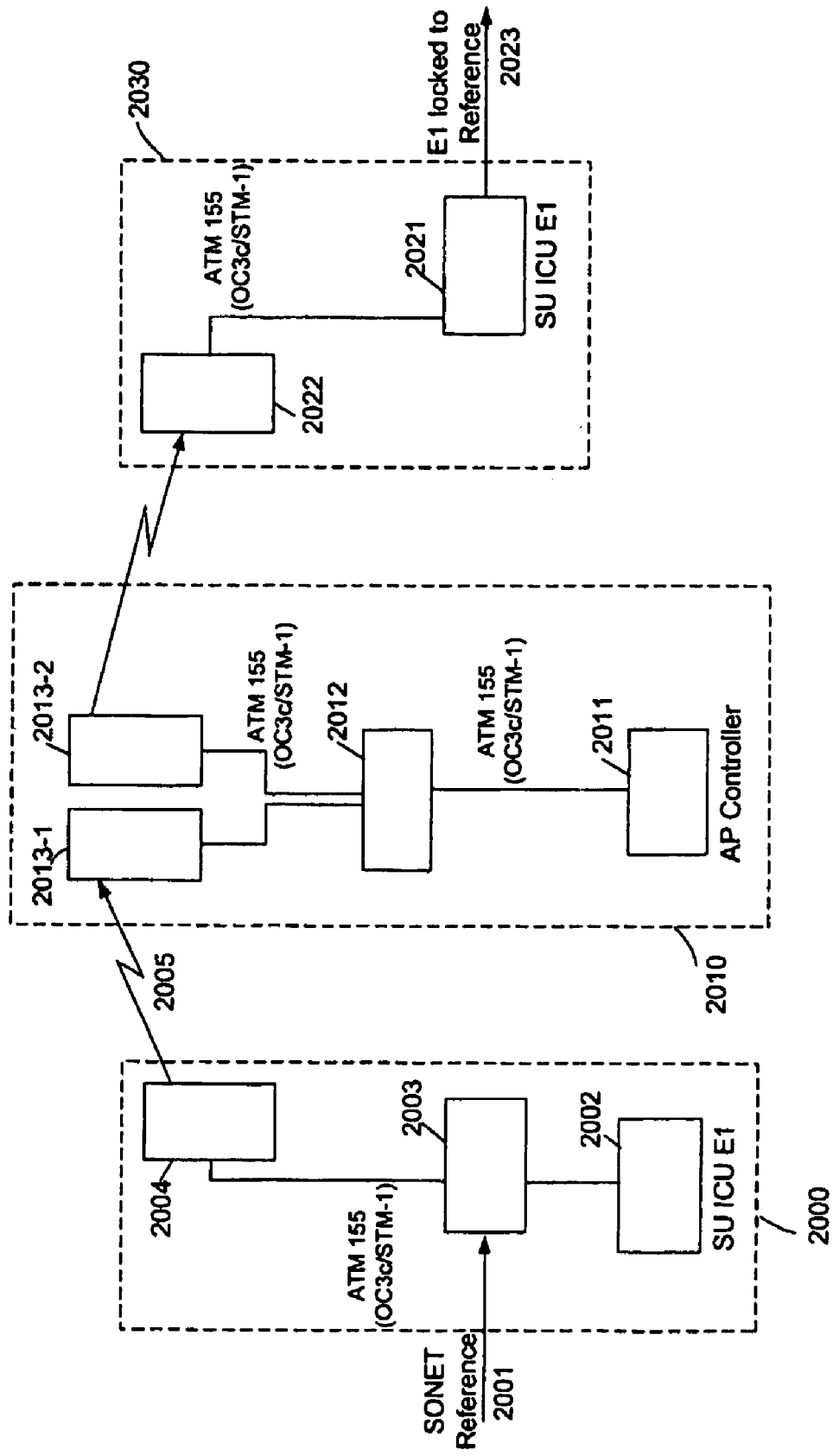
Fig.20 E1 Synchronisation Architecture 8

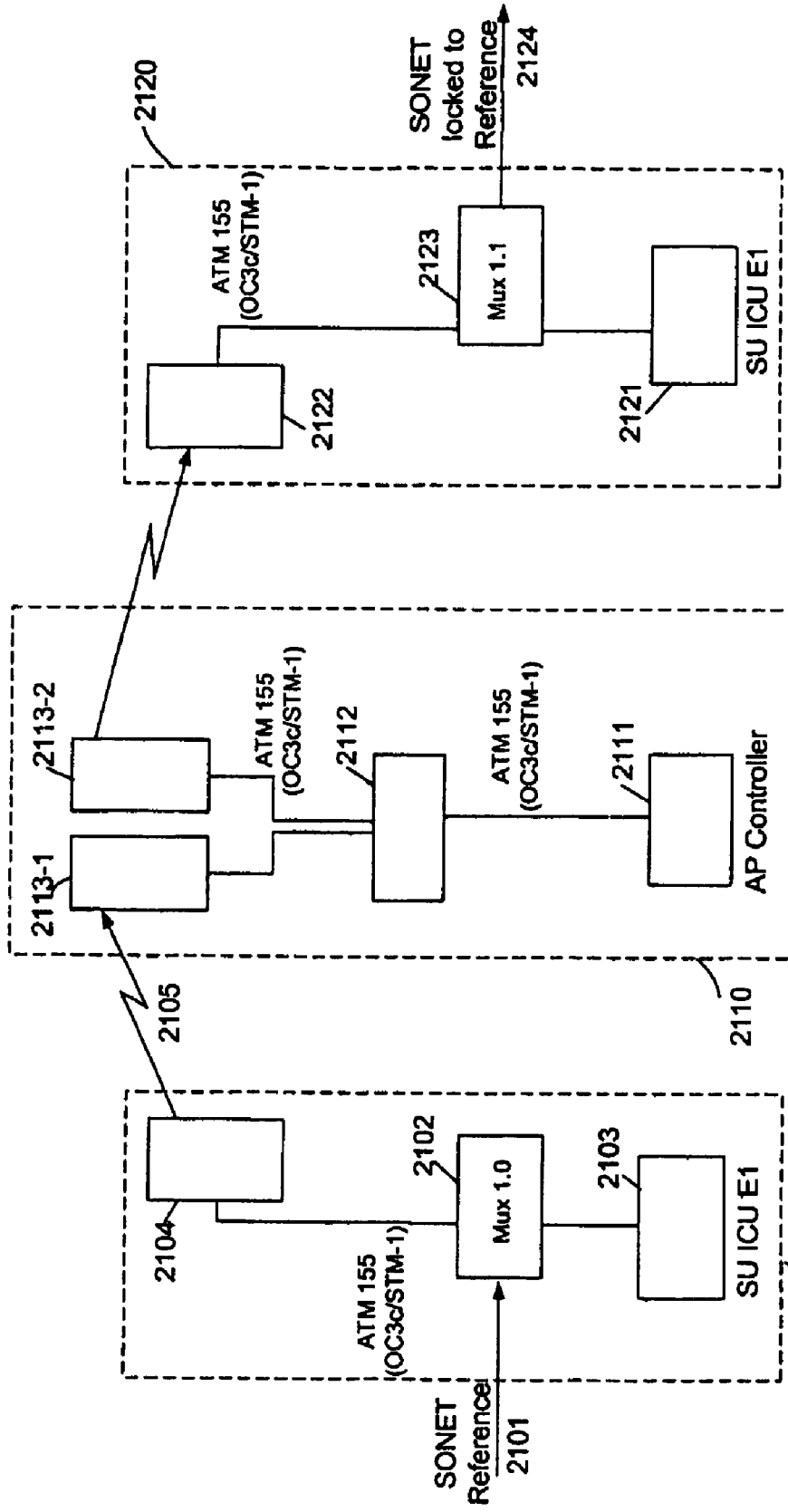
Fig.21  E1 Synchronisation Architecture 9

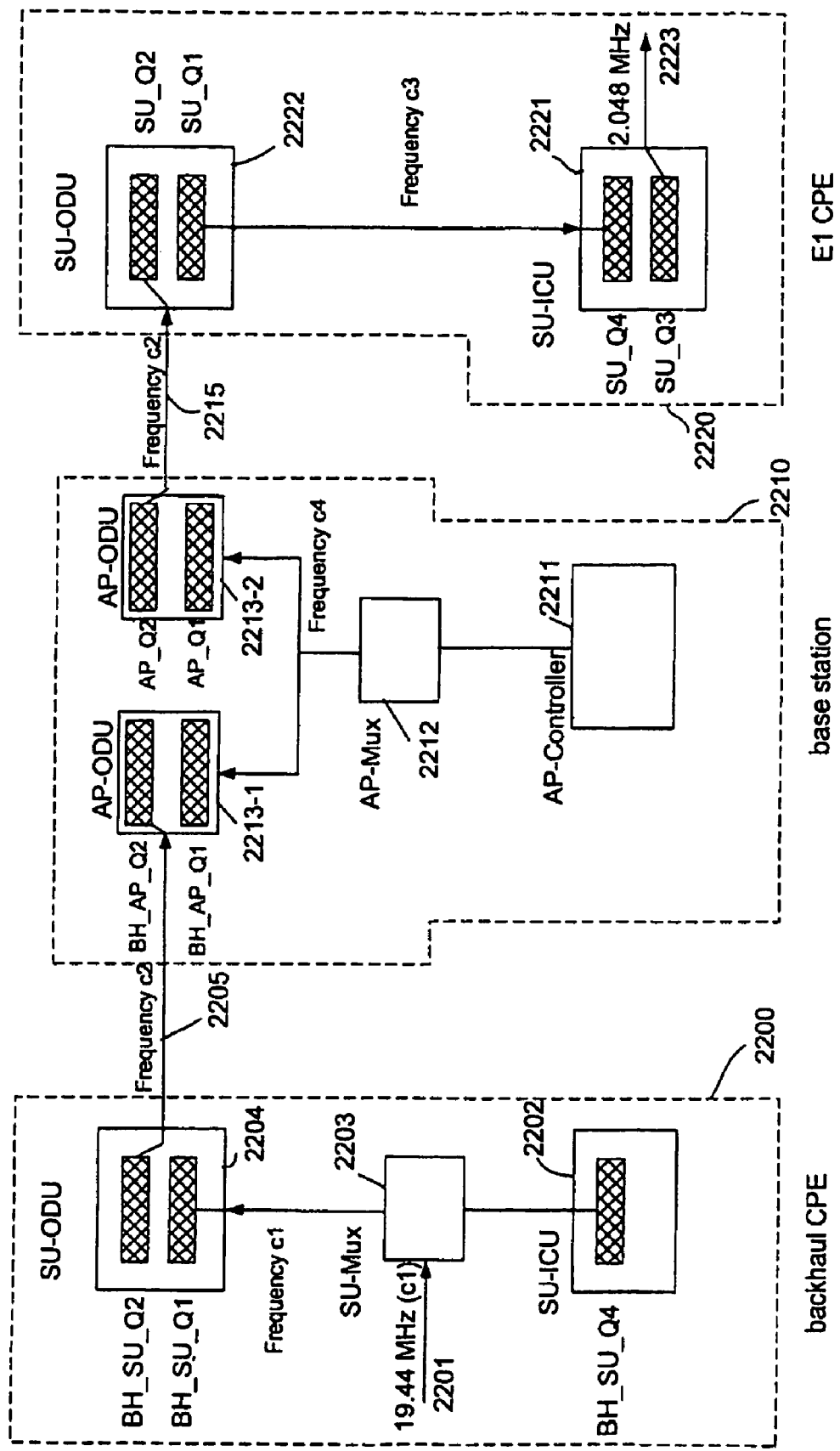
Fig.22 China demo counter architecture

Instantaneous Phase
Difference between
waveforms

Wander between
waveforms

SYNCHRONIZATION IN A COMMUNICATION SYSTEM

The invention relates to a packet switched communications system and to a method of recovering clock signals in such a system.

Asynchronous Transfer Mode (ATM) is a packet based transport medium designed to be able to carry a wide range of traffic types simultaneously. Communications Networks and in particular fixed wireless access systems (FWA) may use ATM as their inter module transport medium and over the air transport medium. Desirably such systems should be arranged to be flexible and able to be deployed in a wide range of configurations with varying topology. In order to minimise cost, the ATM Physical Interface type may be ATM UNI (User Network Interface), which converts ATM155 SONET synchronous fibre optic interfaces into wired UTOPIA asynchronous interfaces. One disadvantage of this design choice, is the loss of physical layer synchronisation between each module. This means that end-to-end there is no synchronisation over the network.

In a typical simple FWA system, data flowing between the base station (AP) and customer premises equipment (SU) would be carried over three unsynchronised separate links: the base station multiplexer (AP-Mux) to the base station outdoor unit (AP-ODU) via ATM155, the AP-ODU to the customer premises equipment outdoor unit (SU-ODU) via a radio link, and the SU-ODU to the customer premises indoor control unit (SU-ICU) via ATM155 or ATM25. Each link eg AP-Mux to AP-ODU has a common frequency reference for that link ie the physical layer symbol rate, but this clock floats ie there is no ability to lock it to another reference. So across any one network node, the data is transferred from one physical layer to another.

One of the desirable types services for a Fixed Wireless Access system to support are plesiochronous digital hierarchy (PDH) services, specifically ITU-T G703 E1. This is a synchronous service which requires network synchronisation to international standards, e.g. ITU-T G.823. In order to achieve this two solutions have been proposed. The first is to make a common clock reference available to all interface points in the network where the E1 is sourced or sunk. The second is for the transport network to carry synchronisation information with the data and regenerate an output clock traceable back to a network timing reference. The first solution requires high tolerance clocks available throughout the network and is expensive. The second solution is the only cost effective solution for a Fixed Wireless Access Network.

Typically a FWA system will lock all the physical layer clocks to the synchronisation source, ie each node recovers the clock from the input link and uses this to lock a Phased Locked Loop which drives the output link. In this way all clocks within the system are phase locked. This is, however,- both expensive in terms of additional circuitry and also prone to cause radio link problems if the reference clock is particularly noisy.

The invention provides a packet switched communications system for transmitting synchronous data from a source module to a terminating module over a network comprising plurality of modules interconnected via transmission links, each module operating with a clock of nominal frequency but which is not synchronised with the clocks of the other module(s)and having a single input and one or more outputs where all the outputs are phase locked to each other but are not synchronised with respect to the input, means for determining the accumulated phase difference between the input clock and the output clock of each module, means for transmitting the accumulated phase difference to the terminating module in the network, and means for utilising the received accumulated phase difference at the terminating module to lock the output clock at the terminating module to the input clock at the source module.

In a system according to the invention the relative drift of each link with respect to its neighbours is tracked, rather than attempting to synchronise each ATM link, and the final output clock, which is to be locked to the input clock, is corrected using the tracked relative drift.

The determining means may comprise a first counter for counting clock cycles of the input signal clock, a second counter for counting cycles of the output signal clock, and means for simultaneously reading the counts of the first and second counters.

This has the advantage with respect to using true analogue phase detectors of being able to keep track of accumulated phase differences over time. Conventional analogue phase detectors only indicate instantaneous phase difference and give no information on accumulated phase differences or wander (ie accumulated phase difference). A disadvantage of using counters is that the phase resolution is only available in terms of integer cycles of the counters.

The system may comprise a latch for storing the count of the counter counting the higher frequency clock, the count being clocked into the latch by an edge of the lower frequency clock.

By clocking the count of the higher frequency clock into the latch on a transition of the lower frequency clock the timing resolution is that of the higher frequency clock. For example in a system with an ATM SONET and E1 link the available clocks are 19.44 MHz and 2.048 MHz, respectively. By clocking the 19.44 MHz counter into the latch on a transition of the 2.048 MHz clock phase can be measured to a precision of one 19.44 MHz period, or 51.4 nS, rather than one 2.048 MHz period, or 488 nS.

If an analogue phase detector is used in addition to the counters a more accurate measure of the accumulated phase difference may be obtained, the counters being used to determine how many times the analogue phase detector has wrapped and the analogue phase detector giving the instantaneous phase difference.

The invention further provides a method of recovering clock signals in a packet switched communications network, the network comprising a plurality of modules interconnected via transmission links, each module operating with a clock of nominal frequency but which is not synchronised with the clocks of the other module(s)and having a single input and one or more outputs where all the outputs are phase locked to each other but are not synchronised with respect to the input, the method comprising the steps of:
 a) determining the accumulated phase difference between the input clock and the output clock at each module,
 b) transmitting the determined accumulated phase difference to the terminating module, and
 c) utilising the received accumulated phase difference at the terminating network to recover the clock at the source module of the network.

The method is based on the appreciation that it is not necessary to phase lock the input and output clocks at each module (or node) in the Network but that if the accumulated phase difference is measured at each module and transmitted to the terminating module then it is possible to lock the output clock at the terminating module to the input clock at the source module using the measured and transmitted accumulated phase differences between the input and output clocks at each module.

Figure 2:
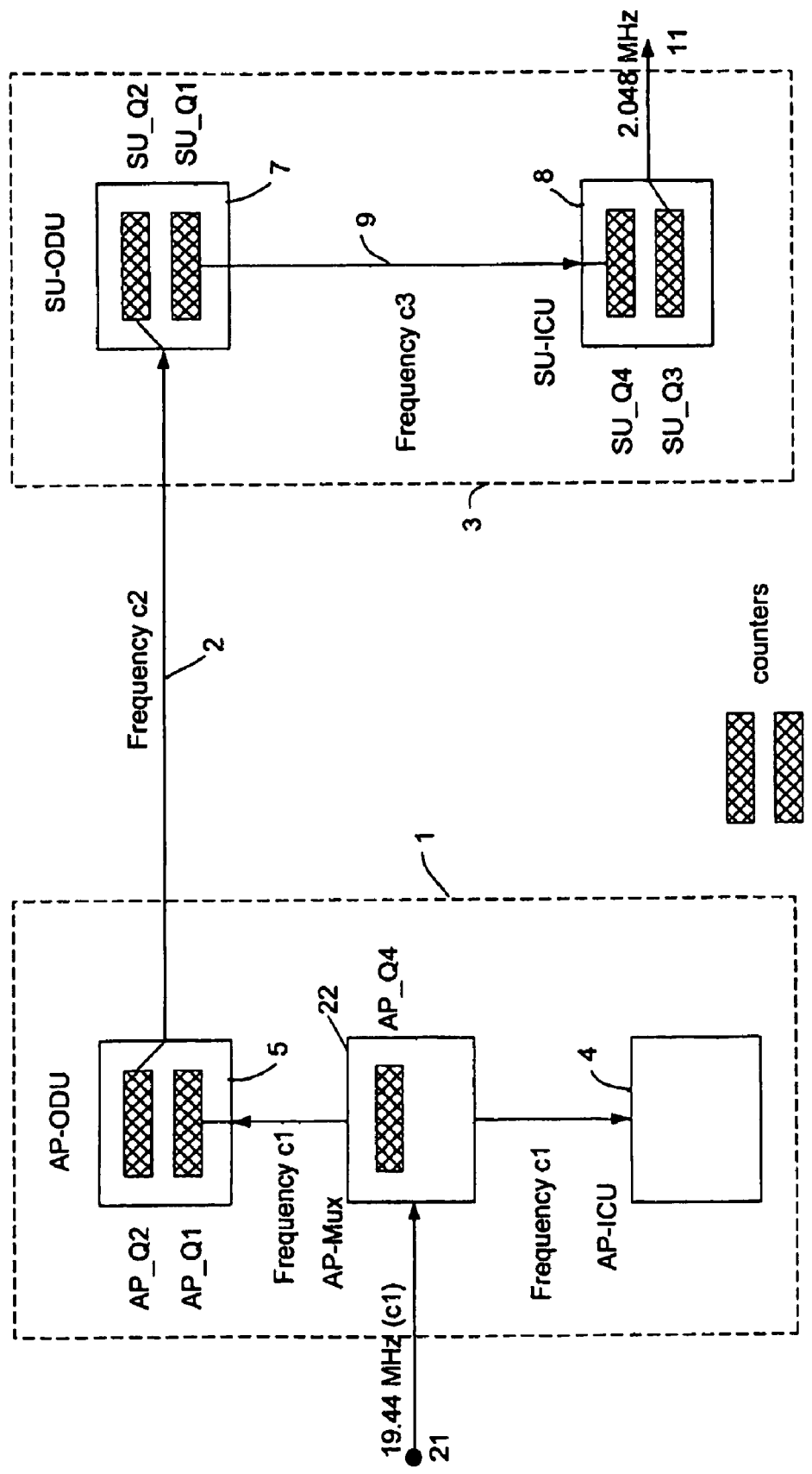
Figure 3:
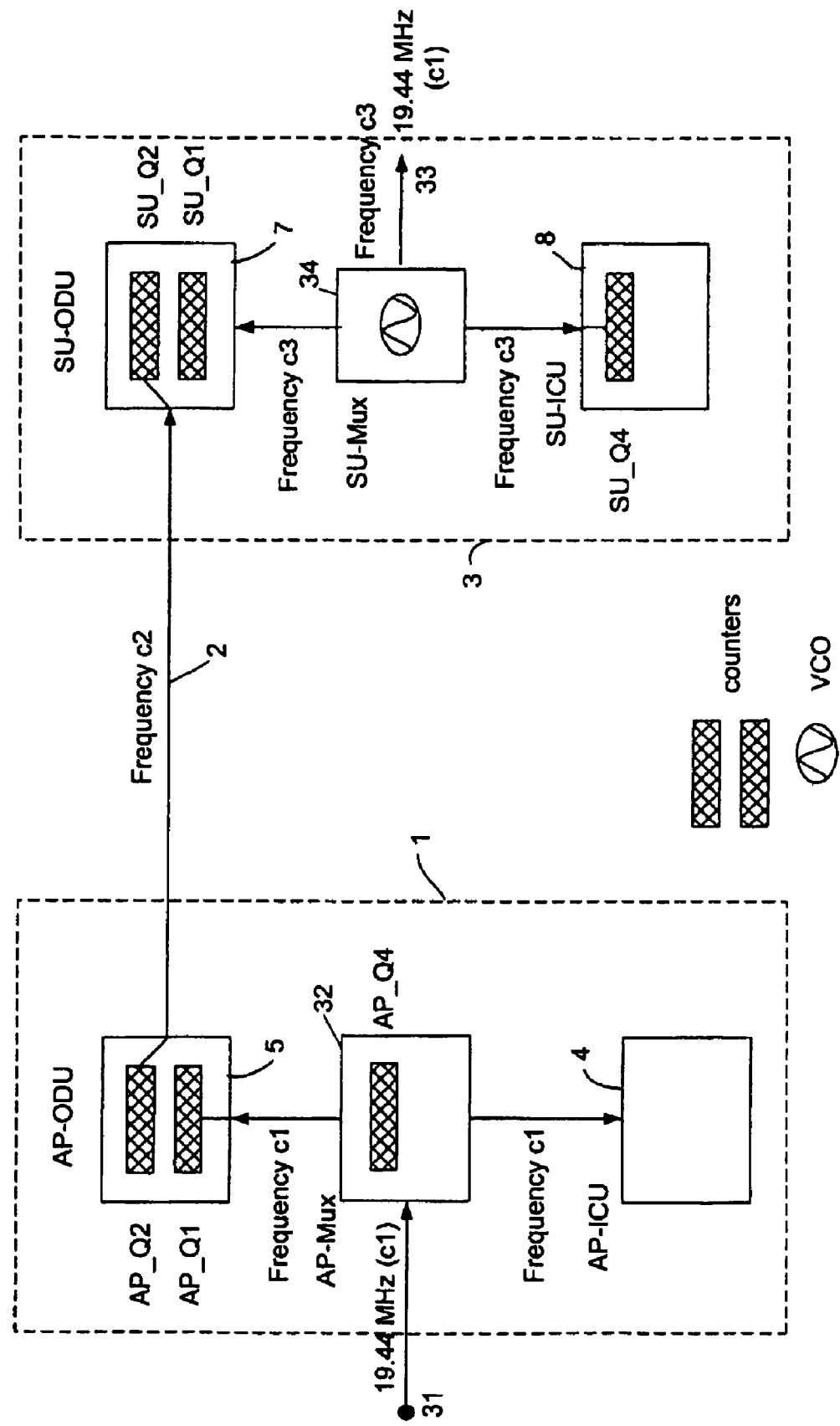
Figure 4:
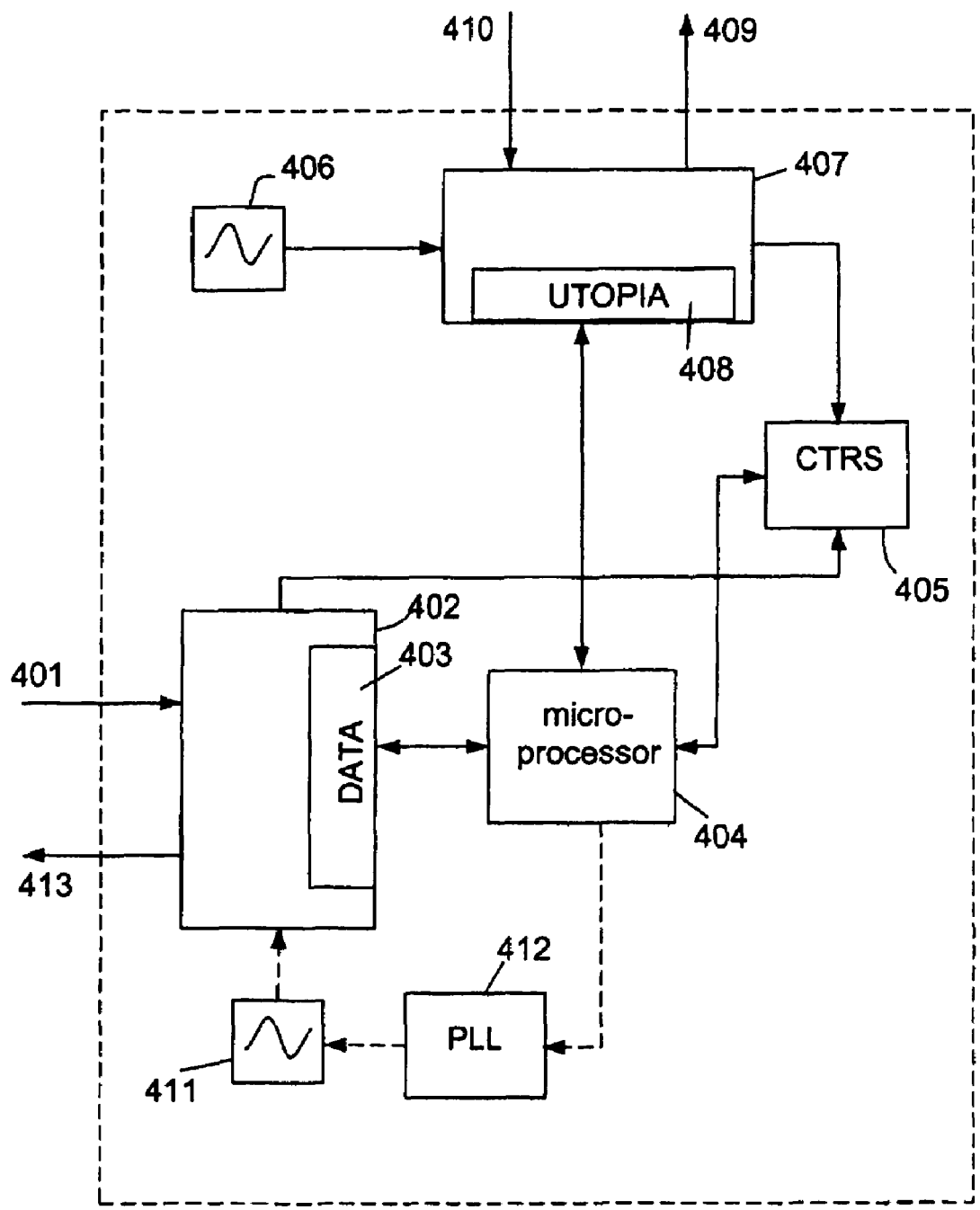
Figure 5:
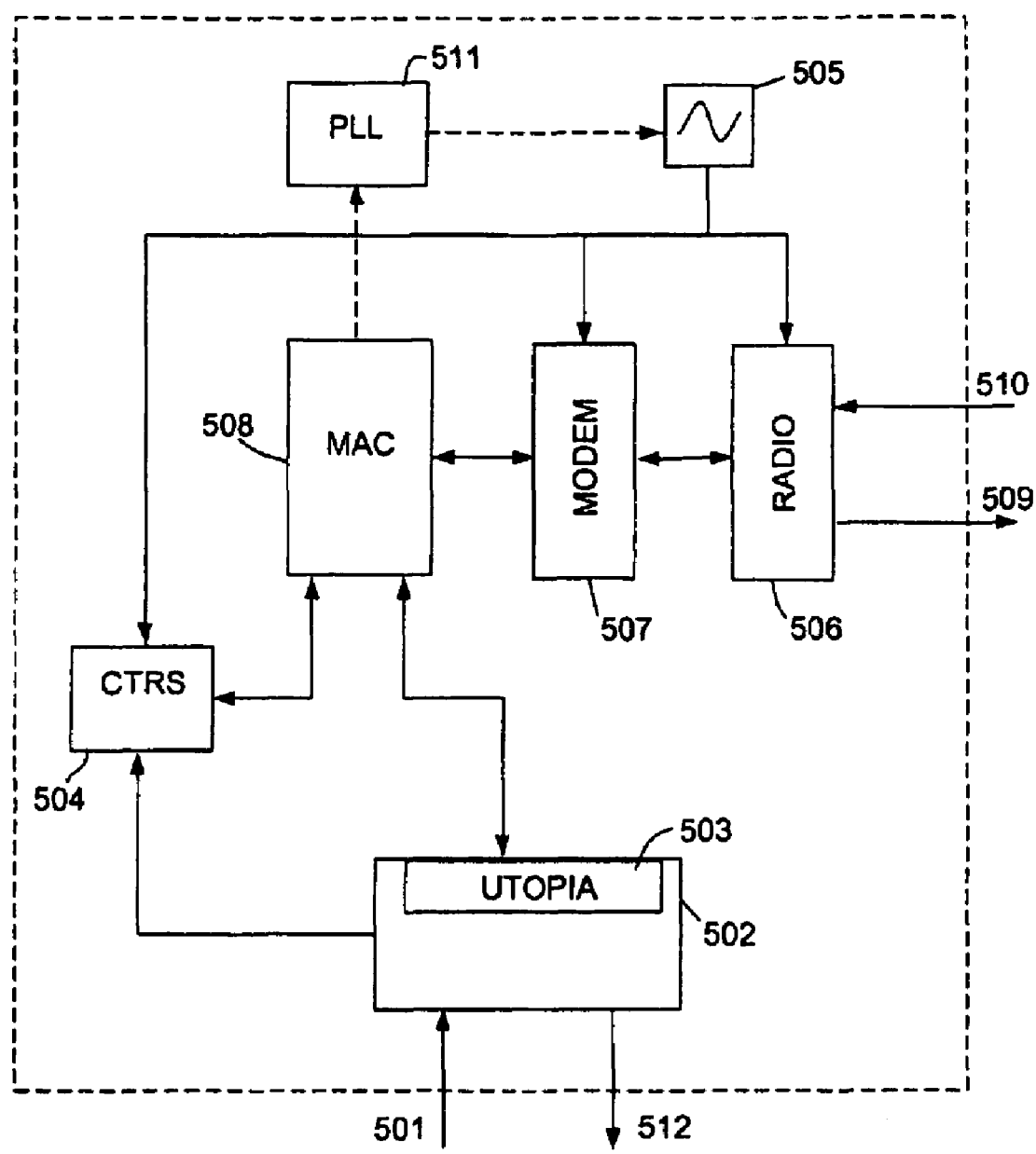
Figure 6:
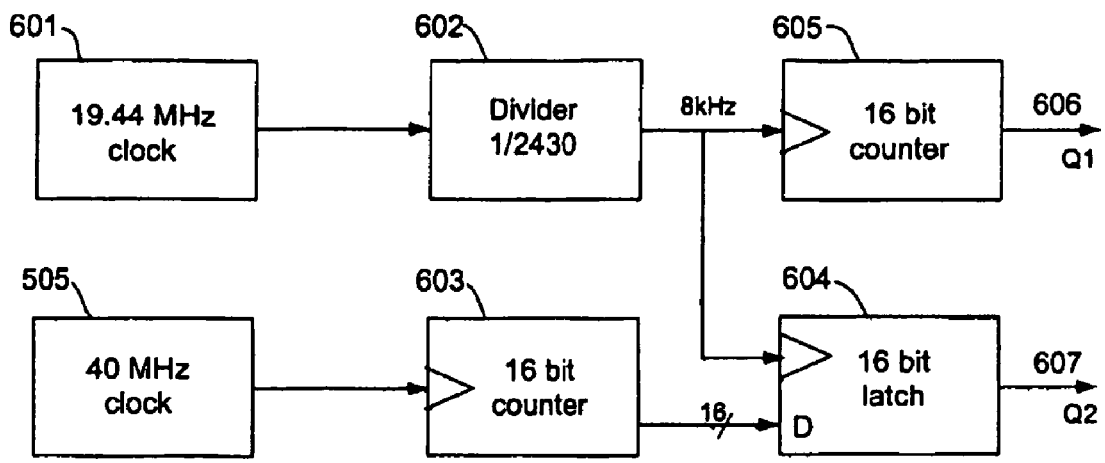
Figure 7:
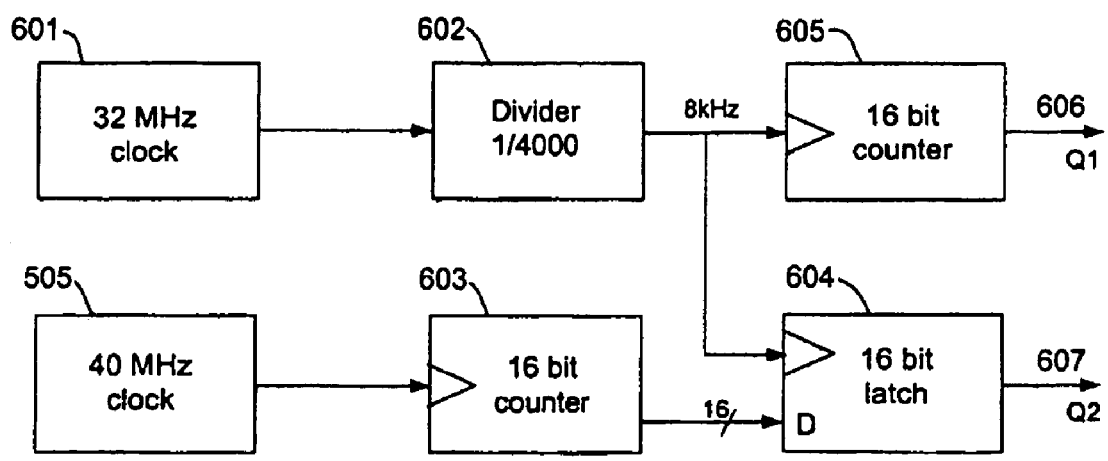
Figure 8:
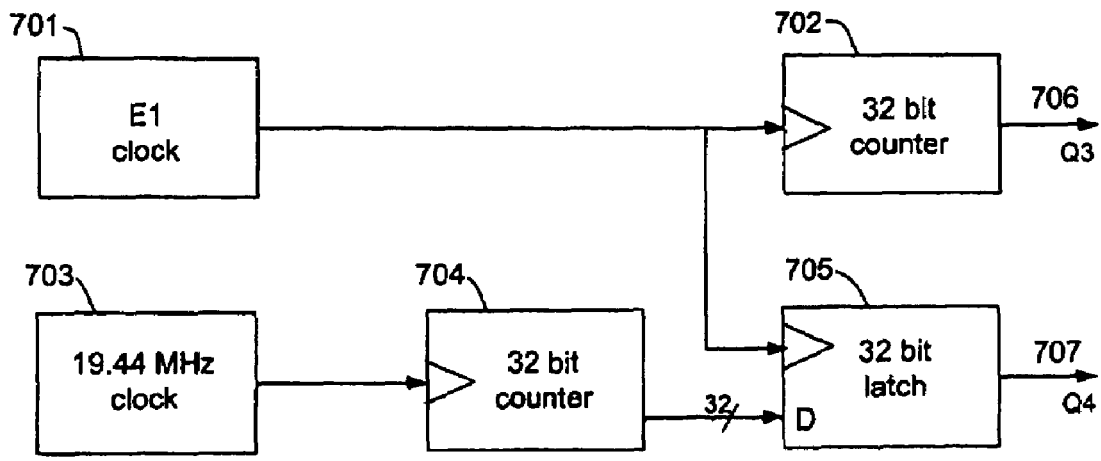
Figure 9:
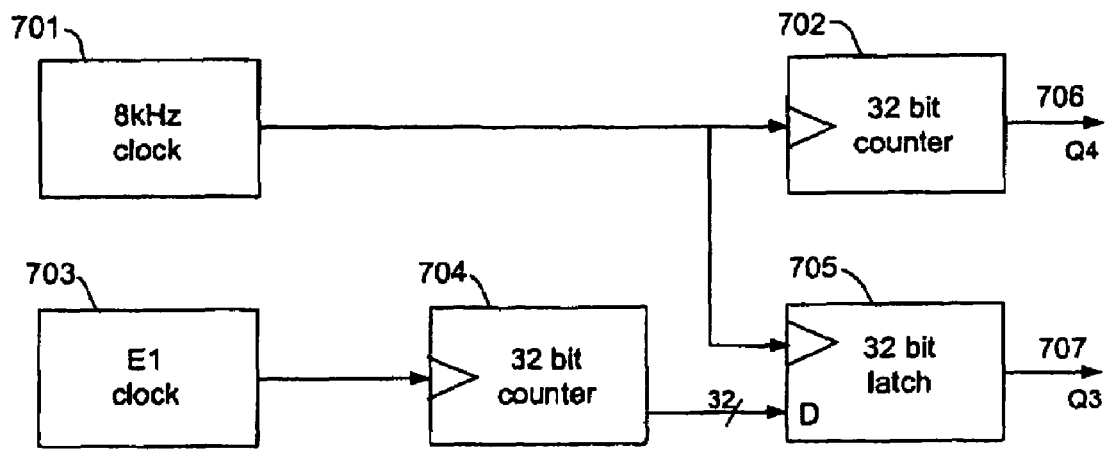
Figure 10:
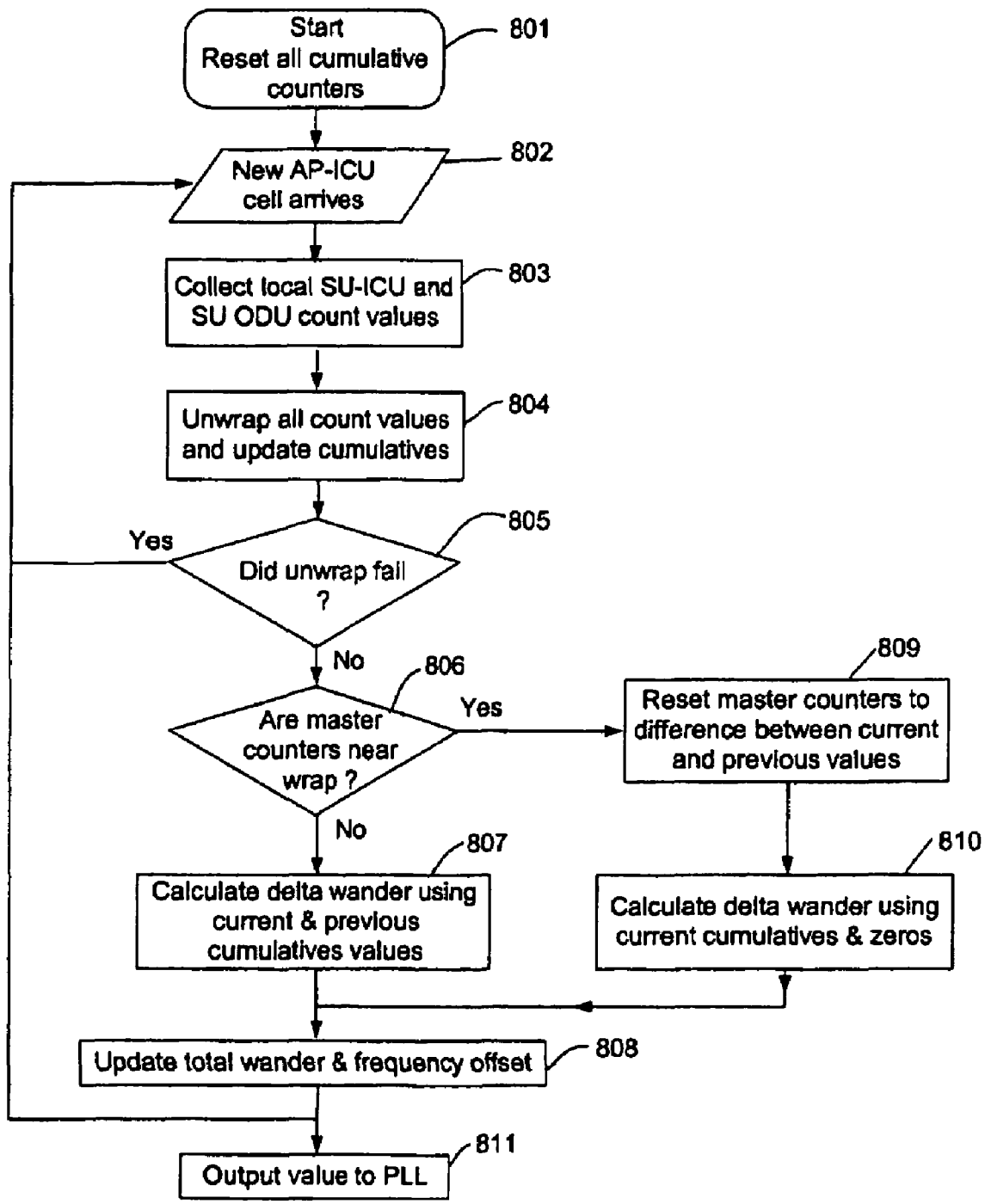
Figure 11:
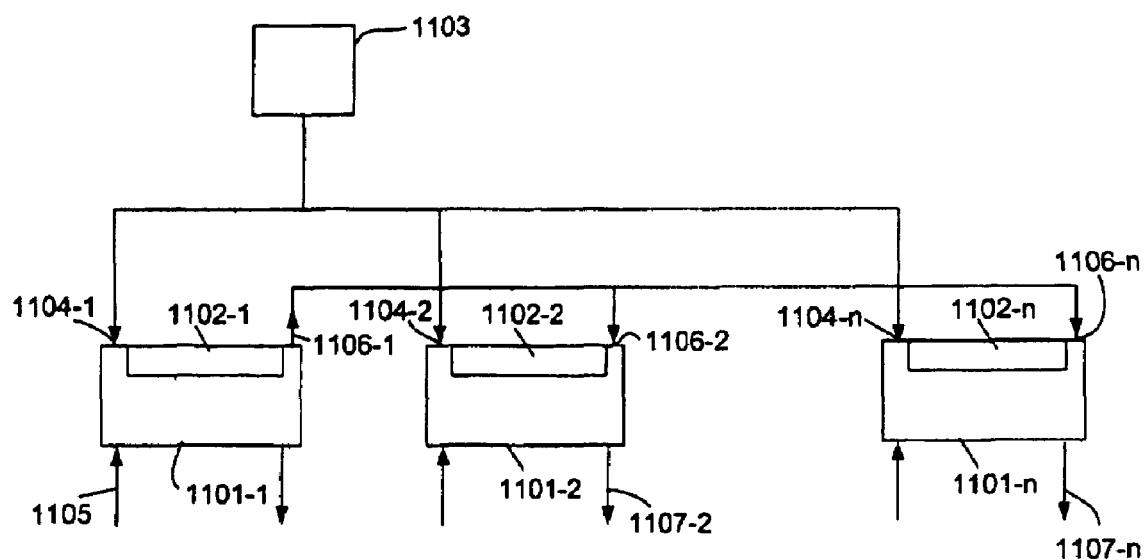
Figure 12:
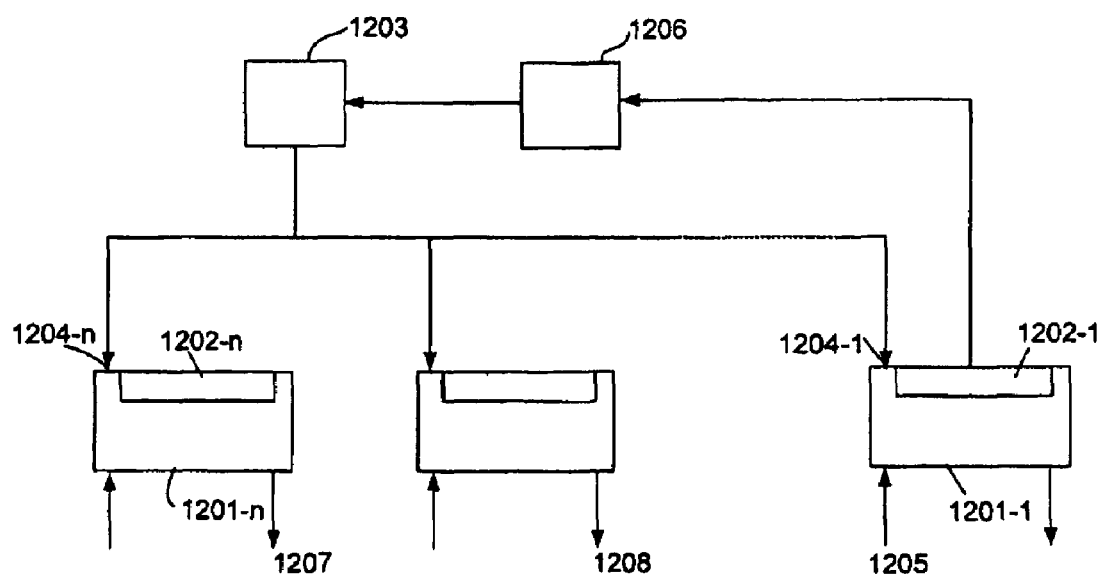
Figure 13:
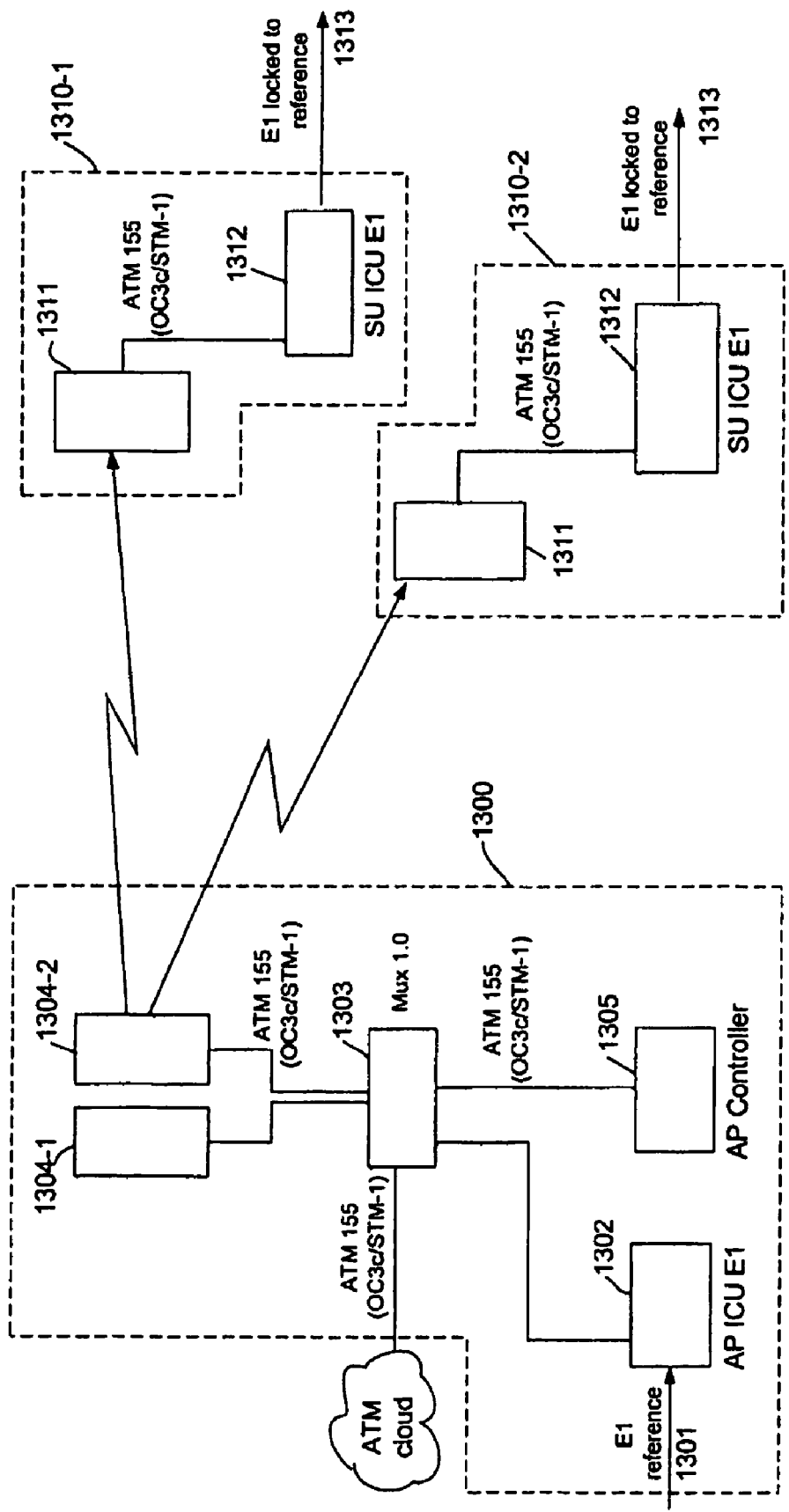
Figure 14:
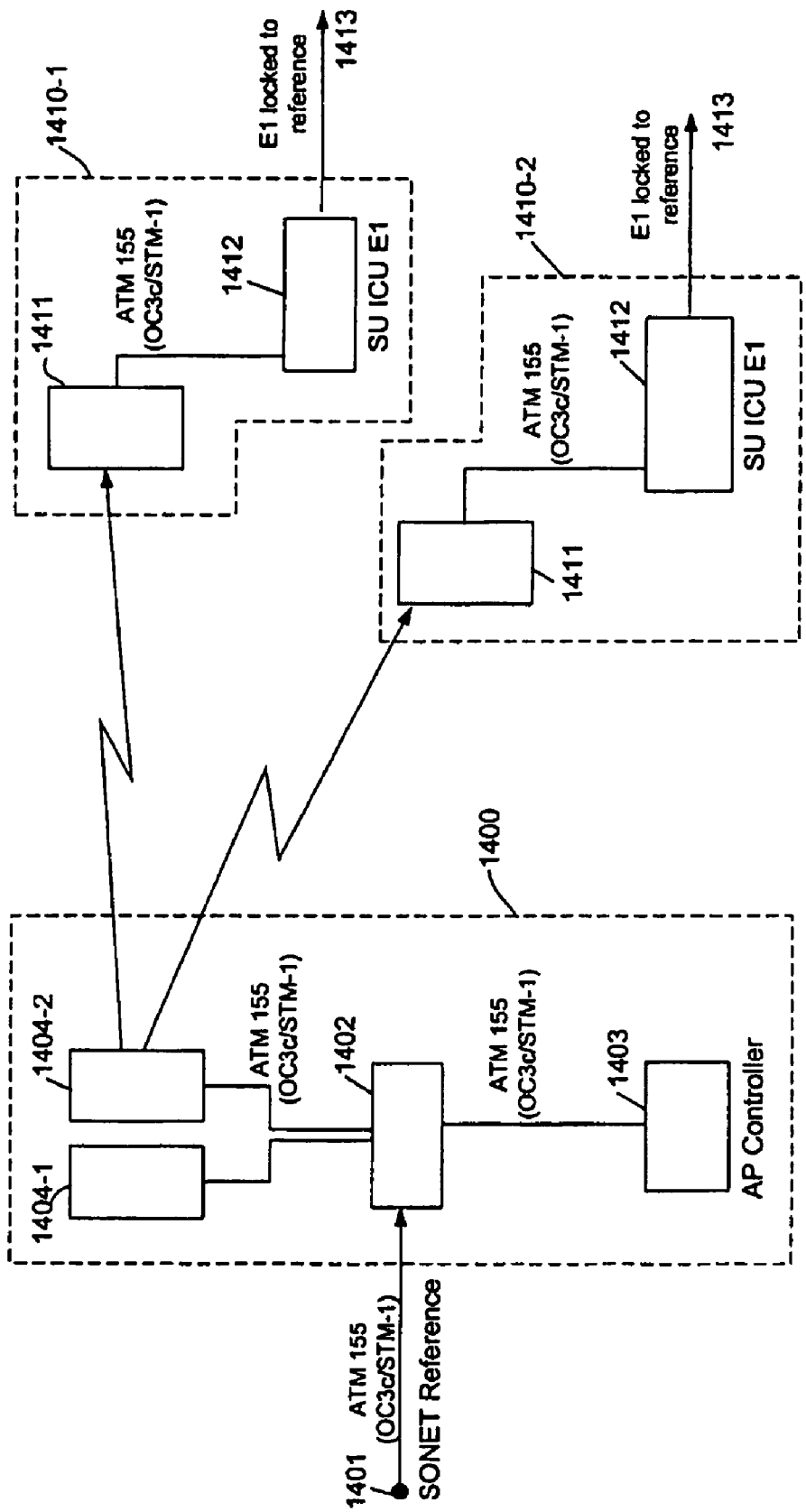
Figure 15:
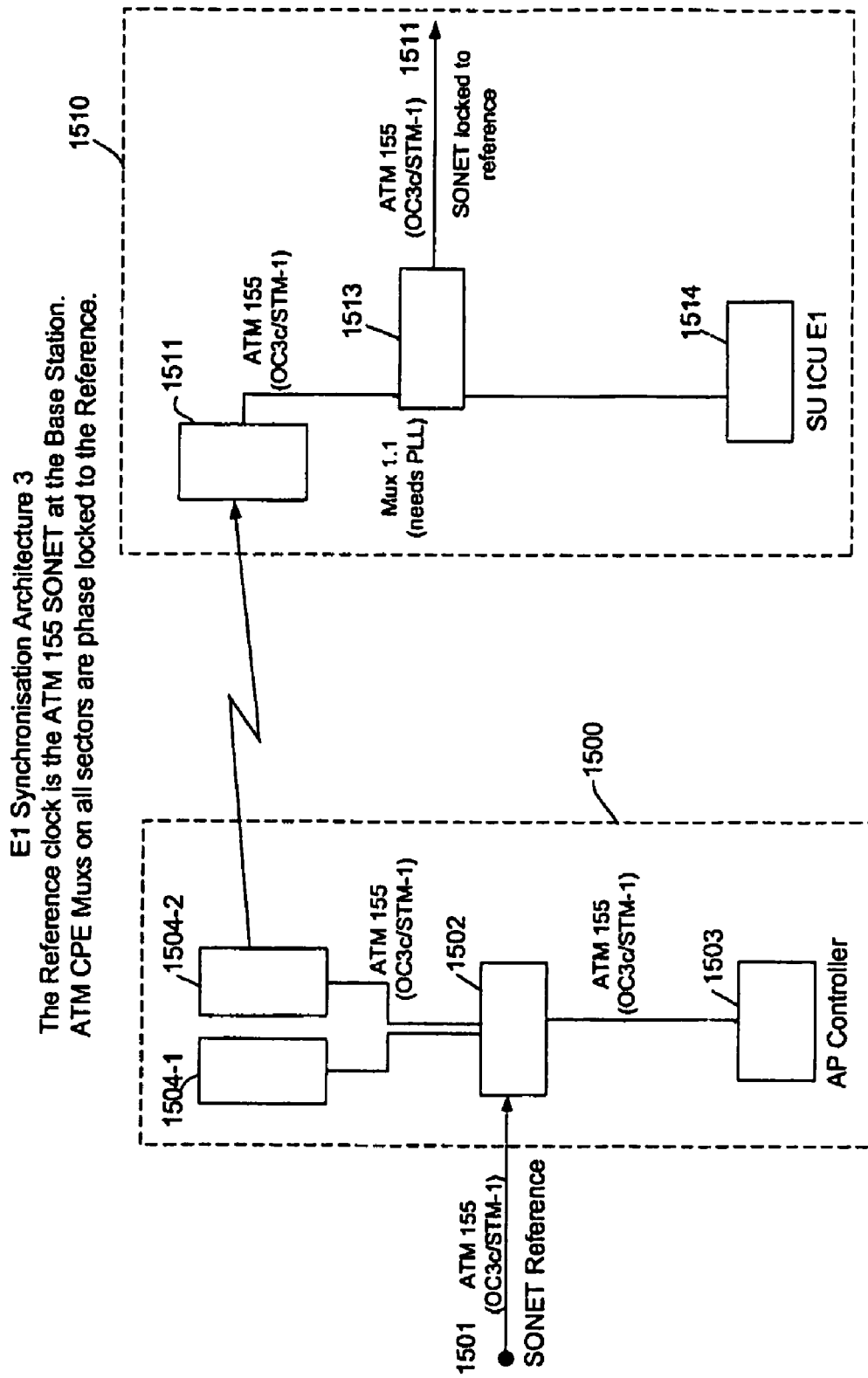

The above and other features and advantages of the invention will be apparent from the following description, by way of example, of embodiments of the invention with reference to the accompanying drawings, in which:

FIG. 1 shows in block schematic form a first embodiment of a communications Network according to the invention, FIG. 2 shows in block schematic form a second embodiment of a communications Network according to the invention, FIG. 3 shows in block schematic form a third embodiment of a communications Network according to the invention, FIG. 4 shows in block schematic form an embodiment of an indoor control unit for a base station and a customer premises equipment, FIG. 5 shows in block schematic form an embodiment of an outdoor unit for a base station and a customer premises equipment, FIG. 6 shows the counter structure in the outdoor units of a base station and a customer premises equipment for ATM155 transport medium, FIG. 7 shows the counter structure in the outdoor units of a base station and a customer premises equipment for ATM25 transport medium, FIG. 8 shows the counter structure in the indoor control unit of a base station and a customer premises equipment, for ATM155 transport medium, FIG. 9 shows the counter structure in the indoor control unit of a base station and a customer premises equipment for ATM25 transport medium, FIG. 10 is a flow diagram illustrating the process used to convert the counter values to a phase difference, FIG. 11 shows in block schematic form a first embodiment of a multiplexer for use in a system according to the invention, FIG. 12 shows in block schematic form a second embodiment of a multiplexer for use in a system according to the invention, FIG. 13 shows in block schematic form a fourth embodiment of a communications Network according to the invention, FIG. 14 shows in block schematic form a fifth embodiment of a communications Network according to the invention, FIG. 15 shows in block schematic form a sixth embodiment of a communications Network according to the invention, FIG. 16 shows in block schematic form a seventh embodiment of a communications Network according to the invention, FIG. 17 shows in block schematic form an eighth embodiment of a communications Network according to the invention, FIG. 18 shows in block schematic form a ninth embodiment of a communications Network according to the invention, FIG. 19 shows in block schematic form a tenth embodiment of a communications Network according to the invention, FIG. 20 shows in block schematic form an eleventh embodiment of a communications Network according to the invention, FIG. 21 shows in block schematic form a twelfth embodiment of a communications Network according to the invention, FIG. 22 shows in block schematic form a thirteenth embodiment of a communications Network according to the invention, and FIG. 23 illustrates instantaneous and accumulated phase differences between two clock signals.

FIG. 1 shows in block schematic form a first embodiment of a communications system according to the invention. As shown in FIG. 1 the communications systems comprises a Network having a base station 1 which communicate's via a radio link 2 with a plurality of customer premises equipment, one of which is shown as 3. The base station 1 comprises an indoor control unit 4 and an outdoor unit 5. The indoor control unit 4 communicates with the outdoor unit 5 over a fibre optic link 6. The customer premises equipment comprises an outdoor unit 7 and an indoor control unit 8 which are coupled by a fibre optic link 9. The clock frequency of the data communicated between the indoor control unit 4 and the outdoor unit 5 of the base station will be approximately 155.52 MHz locked to a 19.44 MHz clock. The clock frequency between the outdoor control unit 5 of the base station and the outdoor unit 7 of the customer premises equipment will be approximately 3.5 GHz locked to a 40 MHz clock. The clock frequency of the data transmitted between the outdoor unit 7 of the customer premises equipment and the indoor control unit 8 will be approximately 155.52 MHz locked to a 19.44 MHz clock when ATM155 is the mode of transmission or approximately 32 KHz when ATM25 is used as the transport medium. In the case of ATM25, however, the data rate is only 25 Mbits/s and the reference clock transmitted is 8 KHz derived from a 32 MHz clock by division. The frequencies mentioned above are examples only and are determined by the particular embodiments of base station and customer premises equipment and by the transmission standards and protocols used. The invention is not limited to the examples given and may be applied to networks having different topologies and using different transmission standards and protocols.

All three clocks are independent of each other that is they float relative to one another. Each will be derived from a separate crystal oscillator. The crystal oscillators are preferably not of great precision, that is, not oven controlled crystal oscillators due to cost considerations and as a result the frequency of each of the oscillators will vary with temperature, aging of the crystals, etc.

FIG. 1 illustrates an embodiment in which PDH services specifically ITU-T G703E1 are to be transmitted. This is a synchronous service which requires Network synchronisation to international standards, for example, ITU-T G823. This means that the data clock at output 11 has to be locked to the data clock at the input 10. In order to achieve this the accumulated phase differences between the various clocks are determined at each of the modules 4, 5, 7 and 8. The indoor control unit 4 sends an ATM cell every second to all the customer premises equipment indoor control units 8. The ATM cell contains the values of the accumulated phase differences determined in the indoor control unit 4 and the outdoor unit 5 of the base station 1. The indoor control unit 8 at the customer premises equipment 3 also obtains over the transmission link 9 the accumulated phase difference measured in the outdoor unit 7 and has a knowledge of the accumulated phase differences in the indoor control unit 8. From these accumulated phase differences it calculates the relative wander and frequency offset between the data clock at the input 10 and the data clock produced by the indoor control unit 8. It then uses a control circuit to control a clock generator in the indoor control unit 8 to bring it into synchronisation with the data clock applied at the input 10.

Thus, if each Network module is considered as a black box with one input connection and a number of output connections, where all the output connections are phase locked with respect to each other but totally unsynchronised with respect to the input connection, it is only necessary to measure the accumulated phase difference between the input clock and the output clock at each stage and pass this information to the final terminating stage in the Network. The final terminating stage can then calculate from these phase differences the correction needed to its output clock to lock the frequency of the output clock to the data clock of the input to the Network.

FIGS. 4 and 5 show in block schematic form embodiments of indoor control units and outdoor units suitable for use as the indoor control units 4 and 8 and outdoor units 5 and 7 of FIG. 1. As shown in FIG. 4 the indoor control unit has an input 401 which is connected to an interface circuit 402. The interface circuit 402 may be implemented as an integrated circuit available from Dallas Semiconductors under the type reference DS2148. This circuit takes an E1 data signal and extracts the data clock and also presents the data at an asynchronous interface 403. This data is read by a microprocessor 404 which assembles the data into appropriate ATM cells for transmission. The interface circuit 402 has a further output which is connected to a counter block 405. The clock output produced by the interface circuit 402 will be at a nominal frequency of 2.048 MHz and will be locked to the clock generated at the source of the data applied to the input 401. A clock generator 406 which generates a nominal frequency of 19.44 MHz is fed to an interface circuit 407. This interface circuit may be implemented as an integrated circuit produced by PMC Sierra under the type reference PM5350. This circuit is designed to interface to a synchronous optical network (SONET). The interface circuit 407 has an asynchronous interface 408 using the UTOPIA protocol. The microprocessor 404 feeds the ATM cells it has generated to the UTOPIA interface for onward transmission via an output 409. When used in the system shown in FIG. 1, the output 409 is fed to the optical fibre link 6. The interface circuit 407 also has a clock output which replicates the frequency of the clock generator 406. It will be appreciated that the clock generator 406 is not synchronised with the clock generator at the source of the data applied to input 401, although since it is derived from a crystal oscillator it will be of relatively high accuracy in frequency. This output is fed to the counters 405. The counters 405 count the clock pulses from these interface circuits 402 and 407 and the microprocessor 404 reads the clock counts at one second intervals. It then assembles them into an ATM cell to send across the Network. That is, in this embodiment, the method of measuring the accumulated phase difference between the clock output from the interface unit 402 that is the E1 data clock applied to the input 401 and the clock generator 406. Is should be appreciated that the invention is not limited to this particular means of determining accumulated phase difference.

FIG. 5 shows in block schematic form embodiments of the outdoor units 5 and 7. The outdoor unit has an input 501 to which the optical link 6 is connected. The input 501 is connected to an interface circuit 502 which may be that designed and sold by PMC Sierra under the type reference PM5350. As with the interface circuit 407, the interface circuit 502 has an asynchronous data output 503 which operates according to the UTOPIA protocol. The interface circuit 503 also derives a clock from the data input applied to input 501 and outputs this clock to a counter array 504. A clock generator 505, which may be a crystal oscillator operating at a nominal frequency 40 MHz and which is not synchronised with the clock of the data input 501, is fed to the counters 504 and also to a radio module 506 and a modem 507. A media access controller 508 takes the ATM cells from the UTOPIA interface and applies them to the modem 507 where they are appropriately processed for application to the radio module 506 which then transmits them from output 509 over the air link 2. The media access controller 508 also reads the counters at one second intervals and sends their counts to the indoor unit 4 for insertion into the ATM cell which transmits the accumulated phase differences to the terminating module on the Network.

The outdoor unit 7 at the customer premises equipment 3 receives the data transmitted by the base station at input 510. The radio module 506 and modem 507 process the received signal and the modem 507 feeds the data to the media access controller 508. The media access controller 508 produces from the signal received from the modem 507 a control signal which is fed to a control circuit 511 to lock the clock generator 505 to the clock generator 505 of the outdoor unit 5 of the base station 1. That is the clock of the outdoor unit 7 is locked to that of the outdoor unit 5. Data received at the media access controller 508 is fed to the UTOPIA interface 503 and via the interface circuit 502 to the fibre optic link 9 through output 512. It is assumed in this case that the SONET data link 9 is controlled from the indoor control unit 8 and in this case the 19.44 MHz clock for the interface circuit 502 will be derived from the input 501. Again, the media access controller 508 will read the counter counts at one second intervals and this data will be transmitted via the UTOPIA interface to the indoor control unit 8 over the link 9.

At the indoor control unit 8 data is received over the link 9 via the input 410 (FIG. 4) and is read from the UTOPIA interface by the microprocessor 404. The microprocessor 404 will receive data representing the accumulated phase differences between the various floating clock generators in the base station indoor control unit and outdoor unit sent via the ATM cells and will also receive from the media access controller 508 the phase information from the outdoor unit 7. A voltage controlled crystal oscillator 411 produces a clock output at a nominal frequency of 2.048 MHz which it is desired should be phase locked to the 2.048 MHz clock of the input data signal at input 10 in order that E1 data received at input 10 can be reproduced at output 11 in a synchronous manner. The output of the VCO 411 is fed to the counters 405, via the interface circuit 402, together with the output of the clock 406. The microprocessor uses the outputs of these counters together with those received from the modules 4, 5 and 7 to calculate the accumulated phase difference between the output of the VCO 411 and the data clock at the input 10. The microprocessor 404 then produces an appropriate signal to feed a control circuit 412 which pulls the output frequency of the oscillator 411 so that accumulated phase differences between it and the input clock of the data signal applied at input 10 of the base station 1 are reduced to a minimum value. The data transmitted from the input 10 to be delivered at the output 11 is fed by the microprocessor 404 to the data interface 403 and through the interface circuit 402 to an output 413, the output 413 being connected to the output 11 of the Network. In this way E1 data can be transmitted through the Network even though the clocks in the various modules are not synchronised with one another.

In the embodiments described, counters have been used rather than true analogue phase detectors. A prime reason for this is that counters can keep track of accumulated phase over time whereas traditional analogue phase detectors only give information on the instantaneous phase difference and give no information on accumulated phase difference or wander. The disadvantage of using counters is that the phase resolution is only available in terms of integer cycles of the counters. It would be possible to use both counters and analogue phase detectors to give both instantaneous phase values with greater precision and also accumulated phase. A further alternative is to use an analogue phase detector with a counter which counts the number of times and the direction in which the analogue counter wraps to keep a note of accumulated phase differences or wander.

FIGS. 6 and 7 show the structure of the counter block 504 for use in the outdoor units 5 and 7 for different ATM is standards. The counter structure of the counters 504 for ATM155 systems is shown in from FIG. 6. The 19.44 MHz clock 601 is derived from the interface circuit 502 and is fed to a divider 602 which divides the clock by 2,430 to produce an 8 KHz output. The 40 MHz clock 505 is applied to a 16-bit counter 603 whose 16-bit outputs are connected to the D inputs of a 16-bit latch 604. The 8 KHz output from the divider 602 is fed to a 16-bit counter 605. The 8 KHz clock is also used to latch the output of the 16-bit counter 603 into the 16-bit latch 604. The counter outputs are then read from outputs 606 and 607 as Q1 and Q2 respectively.

The structure for ATM25 transmissions shown in FIG. 7 is identical to that for ATM155 transmissions apart from the frequency of the clock 601 and division ratio of the divider 602. In this case, the clock 601 has a frequency of 32 MHz and the divider 602 has a division ratio of 4,000. This again produces an 8 KHz clock at the output of the divider 602.

As is known to the person skilled in the art ATM25 links have a data rate of 25 Mb/s but are locked to a 32 MHz clock. In order to synchronise the two ends of the link an 8 KHz clock is transmitted in the 25 Mb/s data stream, the 8 KHz clock being derived by dividing the 32 MHz clock.

FIGS. 8 and 9 show the structure of the counter block 405 for the indoor control units 4 and 8. FIG. 8 shows the counter block structure for ATM155 systems. A clock 701 which is the E1 clock at 2.048 MHz is fed to a 32-bit counter 702. The 19.44 MHz SONET clock 703 is fed to a 32-bit counter 704 whose 32 outputs are fed to the D inputs of a 32-bit latch 705. The outputs of the counter 704 are latched into the 32-bit latch 705 by the E1 clock 701. The outputs of the counters 702 and 705 are fed to outputs 706 and 707 as outputs Q3 and Q4 respectively. FIG. 9 shows the structure of the counter block for ATM25 services. The counter structure is identical to that of FIG. 8, but the clock 701 is an 8 KHz clock while the clock 703 is an E1 clock at 2.048 MHz.

It will be seen that the counter structures in the indoor control units as shown in FIGS. 8 and 9 and the outdoor units as shown in FIGS. 6 and 7 are basically similar. The only significant difference is the presence of the divider 602 in the outdoor units. It will also be noticed that the slower clock latches the faster clock counter into the 16-bit or 32-bit latch. This means that a transition of the lower frequency clock is used to latch the higher frequency clock count. In this way it is possible to measure phase to an accuracy of one period of the higher frequency clock. The counter outputs Q1 and Q2 which are read by the media access controller 508 are the current 8 KHz clock count and a snap shot of the 40 MHz counter taken at a rising edge of the 8 KHz clock. The 8 KHz counter wraps approximately every eight seconds and the 40 MHz counter wraps every 1.6 milliseconds. Given that the readings are sent every second to the indoor control unit 8 at the customer premises equipment, the indoor control unit at the customer premises unit uses the output Q1 to unwrap Q2 which will have wrapped 610 or 611 times between readings. When the outdoor unit is an ATM25 outdoor unit the 8 KHz clock is also inserted into the ATM25 data stream as the timing reference so that the same clock will be counted in the indoor control unit. When the outdoor unit is an ATM155 outdoor unit the 19.44 MHz clock is the one used to drive the SONET physical interface and hence the same clock is counted in the indoor control unit.

The sequence of events is as follows. The base station indoor control unit 5 uses the local E1 clock to time fixed intervals, for example one second intervals. At each interval it reads the local indoor control unit count values Q3 and Q4 and also the outdoor unit count values Q1 and Q2 via the link 6. All four values are assembled into an ATM cell along with a sequence number identifying the particular ATM cell, ie the sequence number increments with each successive ATM cell. The cell is then broadcast to the indoor control units of all customer premises equipment 3. On receipt of a new cell from the base station indoor control unit 4 each customer premises equipment indoor control unit 8 reads the outputs of Q3 and Q4 of its local indoor control unit counters 405 and also the outputs Q1 and Q2 of its local outdoor unit counters 504. A local sequence number based on the rate of change of the local indoor control unit E1 count is also generated. All ten count values are then sent to the wander evaluation process carried out in the microprocessor 404.

FIG. 10 shows a high level flow diagram for the wander evaluation process. 64-bit cumulative counters are kept for all ten count values (Q1 to Q4 and a sequence number from the base station 1 and corresponding values from the customer premises equipment 3). If there is a significant outage over the air then the unwrapping process fails and a wander estimate cannot be made until two consecutive new count, sets arrive to reset the unwrapping process. If any of the 64-bit cumulative counters are close to wrapping then this is handled in a controlled manner and they are all reset (to non-zero values). The process starts, step 801, by resetting all cumulative counters. The next step 802 is the detection of a new ATM cell containing count values arriving from the base station. Step 803 of the process is to collect the local indoor control unit and outdoor unit counter values, that is, Q1 to Q4 and the sequence number. The base station indoor control unit and outdoor unit count values and sequence number are in the ATM cell which has arrived. The next step 804, is to unwrap all the count values and to update the cumulative counters. A decision 805, is then taken as to whether the unwrapping failed or was successful. If the unwrapping was successful, then a further decision 806, is taken as to whether the cumulative counters are near to wrapping. If the cumulative counters are not near to wrapping then the next step 807 is to calculate the change in wander using current and previous cumulative values. The next step 808, is to update the total wander and frequency offset. The process then loops back to step 802 and awaits the arrival of the next ATM cell. If at step 805 it was detected that the unwrapping process failed, then the process loops back to step 802 and awaits the arrival of a further ATM cell. If at step 806 it is detected that the cumulative counters are near to wrapping then a further step 809, is taken in which the cumulative counters are reset to the difference between current and previous values. Step 810 is then entered where the change in wander using the current and cumulative values and zeros is undertaken. Subsequently, the total wander and frequency offset is updated in step 808. Once the total wander and frequency offset has been updated an output is calculated, step 811, and the output value is applied to a control circuit in the indoor control unit to lock the clock 411 to the data clock of the applied to the input of the base station.

Step 804 unwraps counter values. There are ten counter values to be unwrapped. Q1, Q2, Q3, Q4, and a sequence number from the base station 1 and Q1, Q2, Q3, Q4, and a sequence number from the customer premises equipment 3. Unwrapping requires a knowledge of the previous value so the algorithm is always working on the latest set of count values and the previous set. At the start the previous set of count values is considered to be all zeros. Set out below is pseudo code for the basic unwrapping function which gives the latest and previous value of a wrapping counter together with cumulative unwrapped values and will appropriately increment the cumulative value even if the counter has wrapped.

```
DEFINE cumulative INTEGER 64 bit
DEFINE new_value INTEGER 32 bit
DEFINE tmp_new_value INTEGER 64 bit
DEFINE old_value INTEGER 32 bit
DEFINE limit INTEGER
unwrap (cumulative, new_value, old_value, limit)
  {
    if new_value<old_value then
      {
        tmp_new_value:=new_value+limit
      }
    else
      {
        tmp_new_value:=new_value
      }
    return (cumulative + tmp_new_value-old_value)
  }
```

The following function takes the full count set from either the base station or the customer premises equipment and unwraps all the counters returning incremented cumulative count values. Its inputs are the latest full set of count values, their previous values and the running cumulative totals. The function uses the sequence number to check that it can still unwrap the counters and will flag if it has been unsuccessful. The pseudo code illustrating how this function is achieved is set out below.

```
DEFINE Q1_total, new_Q1_total, Q2_total, new_Q2total,
Q3_total, newQ3_total, Q4_total, new_Q4_total,
seq_no_total,new_seq_no_total INTEGER 64 bit
DEFINE Q1_new, Q1_old, Q2_new, Q2-old, Q3_new, Q3_old,
Q4_new, Q4_old, seq_no_new, seq_no_old INTEGER 32 bit
DEFINE fail BOOLEAN
DEFINE ODU_delta8, ODU_delta40, wrap FLOAT
unwrap_counters
  (Q1_total, Q1_new, Q1_old, Q2_total, Q2_new, Q2_old,
  Q3_total, Q3_new, Q3_old, Q4_total, Q4_new, Q4_old,
  seq_no_total, seq_no_new, seq_no_old)
  {
    // unwrap sequence number and check gap in data
    fail := FALSE
    new_seq_no_total := unwrap(seq_no_total, seq_no_new,
    seq_no_old, s^32)
    if new_seq_no_total - seq_no_total>= 6 then
      {
        fail := TRUE
      }
    // unwrap Q1, Q3 and Q4
    new_Q3_total := unwrap(Q3_total, Q3_new, Q3_old,2^32)
    new_Q4_total := unwrap(Q4_total, Q4_new, Q4_old,2^32)
    new_Q1_total := unwrap(Q1_total, Q1_new, Q1_old,2^16)
    // now unwrap the 40MHz counter
    ODU_delta8 := new_Q1_total - Q1 total
    ODU_delta40 := Q2_new - Q2_old
    wrap := floor(ODU_delta8 *5000 / 65536)
    if ODU_delta40 < 0 then
      {
        wrap := wrap + 1
      }
    new_Q2_total := wrap * 65536 + ODU_delta40 + Q2_total
    return (fail,new_seq_no_total, new_Q1_total,
    new_Q2_total, new_Q3_total, new_Q4_total)
  }
```

The 32 bit counters in the indoor control units and the 16 bit counters in the outdoor units will wrap very frequently. The cumulative counters, though, are much larger and may typically only wrap after several thousand years. In that case, it is not worth going through the exercise of detecting and trapping then wrapping. However, if smaller counters were used then detection of wrapping would be more important.

The wander calculation algorithm used in steps 807 and 810 takes the latest cumulative count set and the previous count set and calculates the incremental wander and the instantaneous frequency offset in Hertz between the two counters, that is the clock of the input data to the source module of the Network to the clock of the output data from the terminating module of the Network. The following pseudo code illustrates one possible embodiment of a method by which the calculation of the incremental wander and frequency offset can be achieved.

```
DEFINE new_AP_Q1, old_AP_Q1, new_AP_Q2, old_AP_Q2,
new_AP_Q3, old_AP_Q3, new_AP_Q4, old_AP_Q4, new_SU_Q1,
old_SU_Q1, new_SU_Q2, old_SU_Q2, new_SU_Q3, old_SU_Q3,
new_SU_Q4, old_SU_Q4, AP_Q1_diff, AP_Q2_diff, AP_Q3_diff,
AP_Q4_diff, SU_Q1_diff, SU_Q2_diff, SU_Q3_diff.
SU_Q4_diff INTEGER 64 bit
DEFINE delay_40 MHZ_ticks, wound_back_SU, ppm_diff, scale,
total_delay, SUtick_SU_ODU_ICU_latency,
SUtick_ODU_to_ODU_delay, SUtick_AP_ICU_ODU_latency,
wind_back_SU_E1_ticks, wound_back_E1, delta_wander,
delta_AP_E1_ticks, freq_diff_Hz FLOAT
method (new_AP_Q1, old_AP_Q1, new_AP_Q2, old_AP_Q2,
new_AP_Q3, old_AP_Q3, new_AP_Q4, old_AP_Q4, new_SU_Q1,
old_SU_Q1, new_SU_Q2, old_SU_Q2, new_SU_Q3, new_SU_Q4,
old_SU_Q4)
  {
    AP_Q1_diff:new_AP_Q1 - old_AP_Q1
    AP_Q2_diff:new_AP_Q2 - old_AP_Q2
    AP_Q3_diff:new_AP_Q3 - old_AP_Q3
    AP_Q4_diff:new_AP_Q4 - old_AP_Q3
    SU_Q1_diff:new_SU_Q1 - old_SU_Q1
    SU_Q2_diff:new_SU_Q2 - old_SU_Q2
    SU_Q3_diff:new_SU_Q3 - old_SU_Q3
    SU_Q4_diff:new_SU_Q4 - old_SU_Q4
    // Calculate ppm difference between AP ATM 155 and SU
    ATM 155 / ATM 25 delay_40MHz_ticks:= SU_Q2 - diff
    AP_Q2diff
    wound_back_SU :=SU_Q1_diff.(1 - (delay_40MHz_ticks /
    SU_Q2_diff))
    ppm_diff:=(AP_Q1_diff - wound_back_SU) /wound_back_SU
    //Need a scale factor which compensates for ATM 25 at
    the CPE end if ATM25_SU then
      {
        //i.e. ATM 25 CPE
        scale:=1
      }
    else
      {
        //i.e. ATM 155 CPE
        scale:=2430
      }
    //Now calculate wander
    SUtick_SU_ODU_ICU_latency := SU_Q4_diff -
    SU_Q1_diff*scale
    SUtick_ODU_to_OCU_delay :=
    delay_40MHz_ticks*SU_Q1_diff*scale / SU_Q2_diff
    SUtick_AP_ICU_ODU_latency := (AP_Q1_diff*scale -
    AP_Q4_diff / scale) * (1 - ppm_diff)
    total_delay := SUtick SU_ODU_ICU_latency +
    SUtick_ODU_to_ODU_delay + SItick_AP_ICU_ODU_latency
    wind_back_SU_E1_ticks := total_delay * SU_Q3_diff /
    SU_Q4_diff
    wound_back_E1 := SU_Q3_diff - wind_back_SU_E1_ticks
    delta_wander := wound_back_E1 - AP_Q3_diff
```

-continued

```
delta_AP_E1_ticks := AP_Q3_diff
freq_diff_Hz := delta_wander / (delta_AP_E1_ticks /
  2048000)
return (delta_wander, freq_Hz, delta_AP_E1_ticks,
  wind_back_SU_E1_ticks_)
}
```

FIG. 2 shows a Network architecture where a base station 1 is transmitting over a radio frequency link 2 to customer premises equipment 3. The protocols used are from SONET/SDH (Synchronous Digital Hierarchy) to ITU-T G703E1. The indoor control unit at a base station may in fact be a standard Pentium personal computer and have no ability to count the 19.44 MHz SONET clock. There is also no E1 clock to count at the base station. The SONET data is fed to input 21 and from there is connected to a multiplexer 22. The multiplexer 22 takes the incoming 19.44 MHz clock and uses it as the SONET clock to the indoor control unit 4 and the outdoor unit 5. The indoor control unit counts the 19.44 MHz clock ticks and derives one second intervals from it. At the same time it creates a nominal E1 clock count as if this E1 clock was phase locked to the 19.44 MHz clock, that is, every 19.44 million SONET clock ticks the fictional E1 clock counts 2.048 million E1 clock ticks. Every second as defined by the 19.44 MHz clock the indoor control unit reads its counters and the counters in the outdoor unit 5 and assembles and transmits an ATM cell containing the counts. This data is sent to all the customer premises equipment indoor control units which will use the method as described with reference to FIG. 10 to measure E1 wander and frequency off set. One advantage of this arrangement is that the customer premises equipment indoor control unit 8 does not need to know the synchronisation source at the base station.

FIG. 11 shows in block schematic form a multiplexer suitable for use as the multiplexer 22 in FIG. 2. Only those features of the multiplexer which are relevant to the present invention have been shown in FIG. 11. The multiplexer comprises a plurality of interface circuits 1101-1 to 1101-n. These interface circuits may be implemented as an integrated circuit produced by PMC Sierra under the type reference PM5350. This circuit is designed to interface to a synchronous optical network (SONET). A 19.44 MHz crystal oscillator 1103 is connected to inputs 1104-1 to 1104-n of the interface circuits 1101-1 to 1101-n. An input 1105, which corresponds to the input 21 in FIG. 2, receives SONET data and the SONET reference clock. Once the interface circuits 1102-1 to 1102-n have been initialised using the crystal oscillator 1103 the interface circuit 1102-1 switches to the clock received on the input 1105. The interface circuit 1101-1 is then locked to the SONET reference input. As described with reference to FIG. 4, the interface circuit 1101-1 produces a clock output locked to the received SONET clock at output 1106-1. This output is fed to inputs 1106-2 to 1106-n of the other interface circuits which now use this clock as their reference instead of the crystal oscillator 1103. Outputs 1107-2 to 1107-n are then phase locked to the SONET reference clock received on input 1105. Thus it will be seen that the SONET reference clock applied to input 21 in the system shown in FIG. 2 will be transmitted to the indoor control unit 4 and the outdoor unit 5 via the interface circuits 1102-2 to 1102-n. These outputs are phase locked to the SONET input reference at input 21. In the particular case of the system shown in FIG. 2 a single input and two outputs are required. In this case the multiplexer requires a minimum of three interface circuits. If more outputs are required, then correspondingly more interface circuits have to be provided.

FIG. 3 shows the Network architecture where a SONET input data signal at input 31 to base station 1 is to be transmitted to a SONET output 33 at customer premises equipment 3. As shown, the input 31 is connected to a multiplexer 32 and as with the arrangement of FIG. 2, the SONET 19.44 MHz clock is relayed from the multiplexer 32 to the indoor control unit 4 and outdoor unit 5. Again, the indoor control unit 4 generates a fictional E1 clock from the 19.44 MHz SONET clock and also determines one second intervals. ATM cells are then transmitted containing the counts in the indoor control unit 4 and outdoor unit 5. The 19.44 MHz clock at the customer premises equipment is located within a multiplexer 34 and the indoor control unit 8 again generates an E1 clock from the 19.44 MHZ clock produced in the multiplexer 34. Thus both indoor control units create a fictional E1 count value from their local 19.44 MHz clock. In this way, E1 wander can still be calculated even though there are no E1 clocks present within the Network. The customer premises indoor control unit 8 calculates the E1 wander from the fictional E1 counts and the other counter counts and controls remotely via signalling embedded ATM cells a voltage controlled oscillator within the multiplexer 34 to reduce the E1 wander to within the limits set in the specification. This ensures that the SONET clock's wander is within ITU-T G703 specifications.

FIG. 12 shows an embodiment of a multiplexer suitable for use as the multiplexer 34 in the system of FIG. 3. As with the multiplexer shown in FIG. 11, the multiplexer shown in FIG. 12 shows only those parts which are used in the implementation of the present invention. The multiplexer comprises a plurality of interface circuits 1201-1 to 1201-n. These interface circuits may be implemented as integrated circuits produced by PMC Sierra under the type reference PM5350. These circuits have an asynchronous UTOPIA interface 1202-1 to 1202-n respectively. A voltage controlled crystal oscillator 1203 generates a frequency of 19.44 MHz and applies this frequency to inputs 1204-1 to 1204-n of the interface circuits respectively. Data from, for example, the indoor control unit 8 shown in FIG. 3 is received on an input 1205 and passed via the UTOPIA interface 1202-1 to a control circuit 1206 which controls the frequency of the voltage controlled oscillator 1203. In the system of FIG. 3 the indoor control unit 8 produces the correction required for the frequency of the voltage controlled oscillator 1203 from the phase differences received from the indoor control unit and outdoor unit of the base station and its own outdoor unit and indoor control unit. By this means, the master clock reference is the voltage controlled oscillator 1203 and determines the data reference clock on line 1207 which is connected to output 33 in the system of FIG. 3. Thus, the master clock for this multiplexer is the voltage controlled oscillator 1203 and it receives data via the interface circuit 1202-1 to control the control circuit 1206 which locks the voltage controlled oscillator 1203 to the reference clock applied to input 31 in FIG. 3. The output 1208 is the output fed to the outdoor unit 7 in the system of FIG. 3.

For fixed wireless access systems there are various synchronisation architectures which may be used with the method disclosed herein. The following description illustrates a number of such possible architectures. It should be noted that these are only given as examples and are not an exhaustive collection of possibilities. In the following embodiments where a multiplexer is required it may take the form either of that shown in FIG. 11 or that shown in FIG. 12 depending on whether the reference clock frequency is to be applied to one of the multiplexer inputs and the other multiplexer outputs are phase locked to the input reference clock or whether one of the interface circuits receives data to phase lock a voltage controlled crystal oscillator to become a reference oscillator and the further outputs are synchronised by means of the voltage controlled crystal oscillator.

FIG. 13 shows a synchronisation architecture in which an E1 reference is available at the base station and all consumer premises equipments are locked to the E1 reference at the base station. The base station 1300 has an input 1301 to which the E1 reference clock is applied. This is applied to the indoor control unit 1302. The base station has a number of outdoor units two of which are shown as 1304-1, 1304-2. The actual number is dependent on system choices and may be greater than two. The base station also has a base station controller 1305 which controls the multiplexer 1303 so that the data to be transmitted is directed to the appropriate one of the outdoor units 1304. The multiplexer may also allow an ATM155 input from other sources to be fed to the outdoor units 1304. A plurality of customer premises equipment 1310-1, 1310-2 only two of which are shown here receive data over air from the base station 1300. Each customer premises equipment 1310 comprises an outdoor unit 1311 and an indoor control unit 1312. The indoor control units produce an output locked to the E1 reference at output 1313. Using this architecture, which is basically the same as that described with reference to FIG. 1, all the customer premises equipment are locked to the E1 reference applied to input 1301 in all sectors from the base station.

It will be appreciated that in fixed wireless access systems it is possible for a base station to transmit to various geographical sectors from a single aerial installation, that is a number of directional aerials are provided on a single post or in a single array which cover different geographical sectors. By single array it is meant that the outdoor units may be remote from each other but each is connected to the indoor control unit 1302 and base station controller 1305 through the multiplexer 1303. Using this particular architecture, all the customer premises equipment on all sectors are phase locked to the reference E1.

FIG. 14 shows an architecture where the reference clock is ATM155 SONET reference at the base station. Customer premises equipment on all sectors are phase locked to the reference. This is essentially similar to the architecture shown in FIG. 2, but is extended to show multiple base station sectors and multiple customer premises equipments. In this case the 19.44 MHz SONET reference is applied from an input 1401 in the base station 1400 to a multiplexer 1402. An indoor control unit 1403 is connected to the multiplexer as are two outdoor units 1404-1 and 1404-2. As discussed with reference to FIG. 13 the number of outdoor units of the base station 1400 is dependent on the base station architecture and is not restricted to two. As described with reference to FIG. 2 the 19.44 MHz SONET clock applied to the input 1401 is the master clock and the outputs from the multiplexer 1402 are locked to it. The indoor control unit 1403 generates a virtual E1 clock from the SONET clock and assembles the ATM cells in the same manner as described with reference to FIG. 2. A number of customer premises equipments 1410-1, 1410-2, only two of which are shown, are provided and receive over a radio link data from the base station 1400. Each customer premises equipment comprises an outdoor unit 1411 and a indoor control unit 1412. The output of the indoor control unit in each customer premises equipment is E1 data locked to the SONET reference clock in the same manner as described with reference to FIG. 2. Thus, the architecture illustrated in FIG. 14 is for a SONET to E1 data communication.

The architecture shown in FIG. 15 has the reference clock as an ATM SONET reference applied to input 1501 at the base station 1500 and the customer premises equipment 1510 on one or more sectors having a SONET output 1511 which is phase locked to the reference at input 1501. This architecture is essentially the same as that shown in FIG. 3 but is expanded to enable a base station with a plurality of sectors to have the customer premises equipment on all sectors phase locked to the reference at input 1501. When a synchronised SONET interface is required at a customer premises equipment then a multiplexer 1513 is required having a voltage controlled 19.44 MHz crystal oscillator reference to allow the multiplexer to adjust its clock to be phase locked to the reference at input 1501. The multiplexer 1502 at the base station merely has to propagate the reference clock from the input 1501 to the outdoor unit 1504-1, 1504-2 and to the indoor control unit 1503 to enable the indoor control unit 1503 to produce the virtual E1 clock and assemble the ATM cells to transmit the count values. Thus the multiplexer 1502 will take the form shown in FIG. 11 while the multiplexer 1513 will take the form shown in FIG. 12.

If a single sector is in self backhaul mode where a customer premises equipment within that sector is the Network interface then the E1 synchronisation reference will come from that customer premises equipment. In order to make the synchronisation method support this configuration, the base station controller merely has to broadcast timing count values from the reference customer premises equipment as if they were its own. The fact that the radios of the outdoor units at all customer premises equipment are locked to the same 40 MHz reference means that this substitution will be valid. The 40 MHz reference is the radio link reference and all the customer premises equipment are phase locked to the base station. There are three variants on this theme as shown in FIGS. 16, 17 and 18.

As shown in FIG. 16, the reference clock is the SONET input at one customer premises equipment and customer premises equipment on that sector only are phase locked to the reference. Customer premises equipment 1600 is the originating module on the network and receives an input at input 1601 which is a SONET reference, that is the 19.44 MHz clock reference for the Network. In the same way as described with reference to FIG. 2, the input 1601 is fed to a multiplexer 1602. An indoor control unit 1603 and an outdoor unit 1604 are connected to the multiplexer. This is essentially the same as the base station 1 in the architecture of FIG. 2 and operates in the same manner. The appropriate counter information is sent to the base station 1610 from which it is rebroadcast to a further customer premises equipment 1620. The customer premises equipment 1620 comprises an outdoor unit 1621 and an indoor control unit 1622 having an output 1623 which is an E1 output phase locked to the SONET reference 1601. This is accomplished in essentially the same manner as described with reference to FIG. 2 but with the interposition of a base station in the radio link 2. The architecture is possible since all customer premises equipment 40 MHz radio clocks are locked to the base station 40 MHz clock.

FIG. 17 shows the situation where the reference clock is an E1 reference applied at an input 1701 to a customer premises equipment 1700. A base station 1710 communicates with the customer premises equipment and receives data transmitted from the customer premises equipment 1700. The base station also relays data from the customer premises equipment 1700 to a further customer premises equipment 1720. The customer premises equipment 1700 comprises an indoor control unit 1702 and an outdoor unit 1703. The customer premises equipment 1720 comprises an indoor control unit 1721 and an outdoor control unit 1722. The indoor control unit 1721 produces an output 1723 which is locked to the E1 reference applied to the input 1701 of the customer premises equipment 1700. This is accomplished in essentially the same manner as described with reference to FIG. 1 but with the interposition of a base station in the radio link 2.

FIG. 18 illustrates the situation where there is a SONET synchronisation reference at an input 1801 to a customer premises equipment 1800 and further customer premises equipments have SONET outputs phase locked to the SONET input. A base station 1810 receives data from the customer premises equipment 1800 and retransmits to a further customer premises equipment 1820 on the same sector. That is, the retransmission takes place using the same outdoor unit in the base station as that which receives the data from the customer premises equipment 1800 The customer premises equipment 1800 comprises an indoor control unit 1802, a multiplexer 1803 and an outdoor unit 1804. The customer premises equipment 1820 comprises an outdoor unit 1821, a multiplexer 1822 and an indoor control unit 1823. The multiplexer 1822 includes a voltage controlled oscillator to produce a frequency locked 19.44 MHz SONET clock. The data output from the customer premises equipment 1820 is available at an output 1824 derived from the multiplexer 1822. This architecture is essentially the same as that shown and described with reference to FIG. 3. Again the base station 1810 merely provides a relay in the radio path between the multiple customer premises equipments and the fact that the radios at all the customer premises equipments are locked to the same 40 MHz reference means that the timing count values from the reference customer premises equipment are broadcast by the base station as though they were its own.

FIGS. 19, 20 and 21 illustrate various architectures where a multiple sector base station is in self backhaul mode. That is a customer premises equipment either within that sector or on a dedicated point-to-point link is the Network interface and therefore synchronisation reference. There are three variants on this theme.

The first architecture illustrated in FIG. 19 is where an E1 synchronisation reference is provided at the backhaul customer premises equipment and an E1 output is provided at further customer premises equipment. In FIG. 19 a backhaul customer premises equipment 1900 has an E1 reference input 1901 connected to its indoor control unit 1902. The indoor control unit 1902 is connected via a fibre optic link 1903 to an outdoor unit 1904. The outdoor unit 1904 transmits over a radio link 1905 to a base station 1910. The base station 1910 comprises an indoor unit 1911, a multiplexer 1912, a first outdoor unit 1913-1 and a second outdoor unit 1913-2. The base station transmits to a further customer premises equipment 1920 over a radio link 1915. The customer premises unit equipment 1920 comprises an indoor control unit 1921, and an outdoor unit 1922. E1 data locked to the reference at the input 1901 of customer premises equipment 1900 is available at output 1923 of customer premises equipment 1920.

With the arrangement shown in FIG. 19 there are two possible methods for synchronising the E1 output from customer premises equipment 1920 at output 1923 to the E1 reference at customer premises equipment 1900 input 1901. The first method is to pull the 19.44 MHz reference at the multiplexer 1912 in the base station to phase lock it to the E1 reference at the customer premises equipment 1900. Each sector then uses the multiplexer's 19.44 MHz clock as a local reference. That is the base station indoor unit 1911 can do the same calculations to determine the wander using counters in the indoor control unit 1902, the outdoor unit 1904, the outdoor unit 1913-1, and the indoor control unit 1911. A phase locked loop within the multiplexer 1912 then pulls the 19.44 MHz oscillator to lock it to the E1 reference. Subsequently, the customer premises equipment 1920 uses the 19.44 MHz clock of the multiplexer 1912 as the local reference.

The second method is for the multiplexer 1912 to present the same floating 19.44 MHz clock to all the outdoor units of the base station and an extra set of counters are used to measure the frequency difference between each outdoor unit's 40 MHz clock and the backhaul outdoor unit's 40 MHz clock using the 19.44 MHz of the multiplexer 1912 as a common reference.

The hardware method with a phase locked multiplexer clock in the base station will scale more simply for multiple backhaul hops as the indoor control unit of the base station will not need to know the full backhaul topology. The software method requires the base station indoor control unit to have an exact knowledge of all backhaul hops and access to counters in all of the backhaul hop outdoor units.

FIG. 20 shows the architecture where the synchronisation source is a SONET reference at an input 2001 of customer premises equipment 2000 and the data out is E1 at an output 2023 of a further customer premises equipment 2020 locked to the SONET reference at input 2001. As shown, the customer premises equipment 2000 comprises an indoor control unit 2002, a multiplexer 2003 and an outdoor unit 2004. The base station comprises an indoor control unit 2011, a multiplexer 2012, and two outdoor units 2013-1 and 2013-2. The customer premises equipment 2020 comprises an indoor control unit 2021 and an outdoor unit 2022. The system shown in FIG. 20 operates in substantially the same way as the architecture described with reference to FIG. 2 but using either of the two methods described with reference to FIG. 19 to lock the multiplexer 2012 in the base station 2010 to the SONET reference or to float the clock in the multiplexer 2012 and use an extra set of counters to measure the frequency difference between each outdoor unit's 40 MHz clock. Again, in this implementation the reference clock at the source customer premises equipment is SONET and the destination customer premises equipment on all sectors are phase locked to that reference.

FIG. 21 shows the situation where a SONET reference at a backhaul or source customer premises equipment is provided and a SONET output at a destination customer premises equipment on another sector is produced. As shown in FIG. 21, a SONET reference is applied to an input 2101 of a customer premises equipment 2100 and to a multiplexer 2102 therein. In the same way as described with reference to FIGS. 2 and 3, an E1 reference clock is generated in indoor control unit 2103 to enable the counter counts to be assembled into ATM packets and transmitted from the outdoor unit 2104 over the radio link 2105 to the base station 2110. The base station 2110 comprises an indoor control unit 2111, a multiplexer 2112 and two outdoor units 2113-1 and 2113-2. The customer premises equipment 2120 comprises an indoor control unit 2121, an outdoor unit 2122 and a multiplexer 2123 which has a voltage controlled oscillator in similar manner to the multiplexer 34 in FIG. 3. Again, there are the same two methods for synchronising the source and destination SONET clocks as described with reference to the architectures of FIGS. 19 and 20.

FIG. 22 illustrates the software method of synchronising an E1 or SONET reference at the input to a backhaul customer premises equipment with an E1 output at a customer premises equipment on another sector.

As shown in FIG. 22, the backhaul customer premises equipment 2200 has an input 2201 to which a SONET reference is applied. The customer premises equipment comprises an indoor control unit 2202, a multiplexer 2203 and an outdoor unit 2204. The customer premises equipment 2200 transmits data over a radio link 2205 to a base station 2210. The base station comprises an indoor control unit 2211, a multiplexer 2212, a first outdoor unit 2213-1 and a second outdoor unit 2213-2. The base station transmits data from outdoor unit 2213-2 over a radio link 2215 to a customer premises equipment 2220. The customer premises equipment comprises an indoor unit 2221 and an outdoor unit 2222. The indoor unit has an output 2223 at which E1 data is made available which is locked to the SONET input at input 2201 of customer premises equipment 2200. The base station controller must broadcast on each sector the content of the counters Q1, Q2, Q3 and Q4 from the backhaul customer premises equipment 2200. It must also broadcast the counters Q1 and Q2 from the outdoor unit 2213-1 which receives the data from the backhaul customer premises equipment. It must then transmit from each outdoor unit in each sector the Q1 and Q2 counts. The customer premises equipment 2220 can then substitute frequency $C2^1$ for C2, that is the 40 MHz radio clock from outdoor unit 2213-1 and the 40 MHz radio link clock from the outdoor unit 2213-2 using the backhaul outdoor unit 2213-1 counters Q1 and Q2 and the counters Q1 and Q2 in the transmitting outdoor unit 2213-2. This gives $$\Lambda SU\_Q2' = \Lambda SU\_Q2 \cdot \frac{\Delta AP\_Q1}{\Delta AP\_Q2} \cdot \frac{\Delta BH\_AP\_Q2}{\Delta BH\_AP\_Q1}$$

After this substitution has been made the standard wander method as described with reference to FIG. 10 can be applied.

Figures 23A, 23B, 23C:
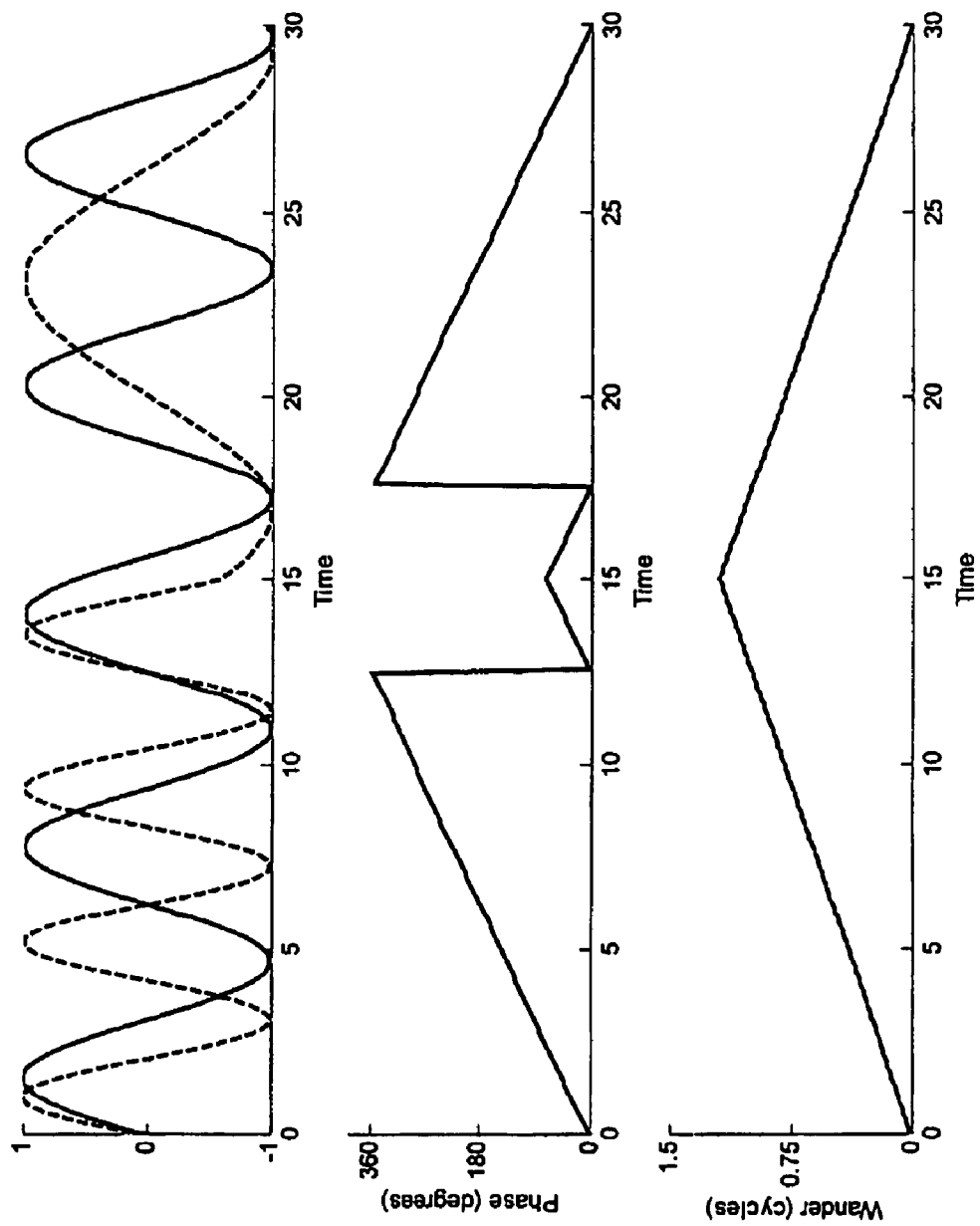

For networks to properly synchronise, in terms of synchronisation it is wander or accumulated phase difference which must be minimised rather than jitter or instantaneous phase differences. This is to say that small phase differences between nodes on a network may not cause any problems as most data equipment can tolerate jitter. The main problems arise when these phase differences increase or decrease to cause wander. FIG. 23a shows two clocks. Initially the dotted clock is faster than the solid clock and then after 15 time units the dotted clock slows down. Over the total period (30 time units) both clocks have gone through the same number of cycles ie the total wander over the period shown is zero. However, the phase difference between waveforms is often zero, as phase is a modulo function, ie it wraps every 360 degrees and hence has no 'memory' of accumulated cycles. This is shown in FIG. 23b. FIG. 23c shows wander. It can be seen that wander is only zero at two points, the start and finish. At the worst point, after 15 time units, the wander is approximately 1.2 cycles. If the wander were allowed to continue it would cause buffer overflows or under-runs in communication equipment and synchronisation would be lost. The present invention tracks wander which means that even if the system is not phase locked at any one point in time, the method tracks the accumulated wander and allows the system to recover the lost or gained cycles by speeding up or slowing down clocks. The method described herein actually tracks wander rather than instantaneous phase and hence is better suited than a method which merely tracks instantaneous phase.

The invention claimed is:

1. A packet switched communications system for transmitting synchronous data from a source module to a terminating module over a network, the network comprising plurality of modules interconnected via transmission links, each module the network having a clock of nominal frequency that is not synchronized with the clocks of the other module(s) in the network and having a single input and one or more outputs where all the outputs of each module are phase locked to each other but are not synchronized with respect to the input, means for determining an accumulated phase difference between an input clock and an output clock of each module, means for transmitting the accumulated phase difference to the terminating module, and means for utilizing the received accumulated phase difference at the terminating module to lock an output clock at the terminating module to an input clock at the source module.

2. A system as claimed in claim 1 in which the accumulated phase difference is transmitted at regular intervals in an ATM data cell.

3. A system as claimed in claim 1 in which the determining means comprises a first counter for counting clock cycles of the input signal clock, a second counter for counting cycles of the output signal clock, and means for simultaneously reading the counts of the first and second counters.

4. A system as claimed in claim 3 comprising a latch for storing the count of the counter counting the higher frequency clock, the count being clocked into the latch by an edge of the lower frequency clock.

5. A system as claimed in claim 3 in which the means for transmitting the phase difference comprises means for assembling an ATM cell containing the counts of the first and second counters.

6. A method of recovering clock signals in a packet switched communications network, the network comprising a plurality of modules interconnected via transmission links, each module having a clock of nominal frequency that is not synchronized with the clocks of the other module(s), each module having a single input and one or more outputs, wherein all the outputs of each module are phase locked to each other but are not synchronized with the input, the method comprising the steps of:
   a) determining the accumulated phase difference between an input clock and an output clock at each module,
   b) transmitting the determined accumulated phase difference to a terminating module, and
   c) utilizing the received accumulated phase difference at the terminating module to recover the clock at a source module of the network.

7. A method as claimed in claim 6 in which the network uses asynchronous transfer mode (ATM) and the accumulated phase difference is transmitted in an ATM cell.

8. A method as claimed in claim 6 in which step a) comprises the steps of:
   d) applying the input clock of a module to a first counter within the module,
   e) applying the output clock of the module to a second counter within the module,
   f) reading the counts of the first and second counters simultaneously at given intervals.

9. A method as claimed in claim 8 in which step d) comprises transmitting the counts read in step f).

10. A method as claimed in claim 8 in which the counters are read on a transition of the lower frequency clock.

11. A system as claimed in claim 2 in which the determining means comprises a first counter for counting clock cycles of the input signal clock, a second counter for counting cycles of the output signal clock, and means for simultaneously reading the counts of the first and second counters.

12. A system as claimed in claim 11 comprising a latch for storing the count of the counter counting the higher frequency clock, the count being clocked into the latch by an edge of the lower frequency clock.

13. A system as claimed in claim 4 in which the means for transmitting the phase difference comprises means for assembling an ATM cell containing the counts of the first and second counters.

14. A system as claimed in claim 11 in which the means for transmitting the phase difference comprises means for assembling an ATM cell containing the counts of the first and second counters.

15. A system as claimed in claim 12 in which the means for transmitting the phase difference comprises means for assembling an ATM cell containing the counts of the first and second counters.

16. A method as claimed in claim 7 in which step a) comprises the steps of:
    d) applying the input clock of a module to a first counter within the module,
    e) applying the output clock of the module to a second counter within the module,
    f) reading the counts of the first and second counters simultaneously at given intervals.

17. A method as claimed in claim 16 in which step d) comprises transmitting the counts read in step f).

18. A method as claimed in claim 9 in which the counters are read on a transition of the lower frequency clock.

19. A method as claimed in claim 16 in which the counters are read on a transition of the lower frequency clock.

20. A method as claimed in claim 17 in which the counters are read on a transition of the lower frequency clock.

\* \* \* \* \*